United States Patent
Gupta et al.

(10) Patent No.: US 12,141,051 B2
(45) Date of Patent: Nov. 12, 2024

(54) MACHINE-LEARNING-BASED TECHNIQUES FOR PREDICTIVE MONITORING OF A SOFTWARE APPLICATION FRAMEWORK

(71) Applicants: ATLASSIAN PTY LTD., Sydney (AU); ATLASSIAN US, INC., San Francisco, CA (US)

(72) Inventors: Vipul Gupta, Banglore (IN); Akshar Prasad, Bengaluru (IN)

(73) Assignees: Atlassian Pty Ltd, Sydney (AU); Atlassian US, Inc., San Francisco, CA (US)

( * ) Notice: Subject to any disclaimer, the term of this patent is extended or adjusted under 35 U.S.C. 154(b) by 37 days.

(21) Appl. No.: 17/804,702

(22) Filed: May 31, 2022

(65) Prior Publication Data
US 2023/0385182 A1    Nov. 30, 2023

(51) Int. Cl.
G06F 9/44    (2018.01)
G06F 11/36    (2006.01)

(52) U.S. Cl.
CPC .................. *G06F 11/3672* (2013.01)

(58) Field of Classification Search
CPC .................................................. G06F 11/3672
USPC ........................................................ 717/105
See application file for complete search history.

(56) References Cited

U.S. PATENT DOCUMENTS

2006/0230343 A1* 10/2006 Armandpour ......... G06F 16/958
707/E17.116
2013/0263090 A1* 10/2013 Polk ....................... A63F 13/60
717/124

* cited by examiner

*Primary Examiner* — Chuck O Kendall
(74) *Attorney, Agent, or Firm* — Alston & Bird LLP

(57) ABSTRACT

Various embodiments of the present invention provide methods, apparatuses, computing devices, and/or the like that are configured to perform software application framework monitoring using alert signatures for the software applications that are generated by at least one of: (i) a conditional ensemble machine learning framework comprise one or more alert priority score generation machine learning models, one or more alert priority explanation generation machine learning models, and a conditional ensemble machine learning model that is configured to generate an explanation-inclusive alert signature if a deep-learning-based alert priority score generated by the alert priority score generation machine learning models is identical to a decision-tree-based alert priority designation generated by the alert priority explanation generation machine learning models, and (ii) a set of alert priority score adjustment models such as an entity-based alert priority score adjustment model, a temporal alert priority score adjustment model, and a similarity-based alert priority score adjustment model.

20 Claims, 17 Drawing Sheets

○ ○ ○ | ○ Opsgenie - Alerts | +

← → C | ⊕ https://www.team.app.opsgenie.com/alerts

○ Opsgenie  Alerts  Incidents  Who is on-call  Teams Services Analytics

Alerts | Create alert

{Q} status: open | ? | Search | Save

⊘ See all alerts | All Time ˅

Saved searches | ○ Select
PREDEFINED
All — 1501
Open | PREDICTED INCIDENTS
Closed | #4 (P1) [AI-generated prediction title] ⊗ service-02 ⊗ [team name] | 29 Oct 2022 12:26 pm | PREDICTED
Untacked | #3 P1 [AI-generated prediction title] ⊗ service-02 ⊗ [team name] | 28 Oct 2022 12:26 pm | PREDICTED
Not Seen
Assigned to me | OPEN ALERTS ☐ #XY P1 Increased error rates in the SQL Server | Omar Daboe | OPEN
x7 | 05 Jun 2021 5:49 pm ☐ #XY P1 Increased error rates in the SQL Server | Omar Daboe | OPEN
x7 | 05 Jun 2021 5:49 pm ☐ #XY P1 Increased error rates in the SQL Server | Omar Daboe | OPEN
x7 | 05 Jun 2021 5:49 pm ☐ #XY P1 Increased error rates in the SQL Server | Omar Daboe | OPEN
x7 | 05 Jun 2021 5:49 pm ☐ #XY P1 Increased error rates in the SQL Server | Omar Daboe | OPEN
x7 | 05 Jun 2021 5:49 pm

MACHINE-LEARNING-BASED TECHNIQUES FOR PREDICTIVE MONITORING OF A SOFTWARE APPLICATION FRAMEWORK

BACKGROUND

Various methods, apparatuses, and systems are configured to provide techniques for monitoring software application frameworks. Applicant has identified many deficiencies and problems associated with existing methods, apparatuses, and systems for monitoring software application frameworks. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like that are configured to enable effective and efficient monitoring of software application frameworks. For example, certain embodiments of the present invention provide methods, apparatuses, systems, computing devices, and/or the like that are configured to perform software application framework monitoring using alert signatures for the software alert data objects that are generated by at least one of: (i) a conditional ensemble machine learning framework comprise one or more alert priority score generation machine learning models, one or more alert priority explanation generation machine learning models, and a conditional ensemble machine learning model that is configured to generate an explanation-inclusive alert signature if a deep-learning-based alert priority score generated by the alert priority score generation machine learning models is identical to a decision-tree-based alert priority designation generated by the alert priority explanation generation machine learning models, and (ii) a set of alert priority score adjustment models such as an entity-based alert priority score adjustment model, a temporal alert priority score adjustment model, and a similarity-based alert priority score adjustment model.

In accordance with one aspect, a computer-implemented method is provided. In one embodiment, the computer-implemented method comprises: identifying a software alert data object for the software application framework, wherein the software alert data object is associated with one or more alert attribute data fields; generating, using an alert classification neural network machine learning model, and based on the one or more alert attribute data fields, a deep-learning-based alert priority designation for the software alert data object; generating, using an alert classification decision tree machine learning model, and based on the one or more alert attribute data fields, a decision-tree-based alert priority designation for the software alert data object; generating, based on the deep-learning-based alert priority designation and the decision-tree-based alert priority designation, an alert signature for the software alert data object; and performing one or more incident management actions based on the alert signature.

In accordance with another aspect, a computer program product is provided. The computer program product may comprise at least one computer-readable storage medium having computer-readable program code portions stored therein, the computer-readable program code portions comprising executable portions configured to: identify a software alert data object for the software application framework, wherein the software alert data object is associated with one or more alert attribute data fields; generate, using an alert classification neural network machine learning model, and based on the one or more alert attribute data fields, a deep-learning-based alert priority designation for the software alert data object; generate, using an alert classification decision tree machine learning model, and based on the one or more alert attribute data fields, a decision-tree-based alert priority designation for the software alert data object; generate, based on the deep-learning-based alert priority designation and the decision-tree-based alert priority designation, an alert signature for the software alert data object; and perform one or more incident management actions based on the alert signature.

In accordance with yet another aspect, an apparatus comprising at least one processor and at least one memory including computer program code is provided. In one embodiment, the at least one memory and the computer program code may be configured to, with the processor, cause the apparatus to: identify a software alert data object for the software application framework, wherein the software alert data object is associated with one or more alert attribute data fields; generate, using an alert classification neural network machine learning model, and based on the one or more alert attribute data fields, a deep-learning-based alert priority designation for the software alert data object; generate, using an alert classification decision tree machine learning model, and based on the one or more alert attribute data fields, a decision-tree-based alert priority designation for the software alert data object; generate, based on the deep-learning-based alert priority designation and the decision-tree-based alert priority designation, an alert signature for the software alert data object; and perform one or more incident management actions based on the alert signature.

In accordance with one aspect, a computer-implemented method is provided. In one embodiment, the computer-implemented method comprises: identifying a software alert data object for the software application framework, wherein the software alert data object is associated with one or more alert attribute data fields and a deep-learning-based alert priority score; generating, based on the one or more alert attribute data fields and using one or more alert priority score adjustment models, one or more alert priority score adjustment scores for the software alert data object; generating an alert priority score for the software alert data object based on the deep-learning-based alert priority score and the one or more alert priority score adjustment scores; generating an alert signature for the software alert data object based on the alert priority score; and performing one or more incident management actions based on the alert signature.

In accordance with another aspect, a computer program product is provided. The computer program product may comprise at least one computer-readable storage medium having computer-readable program code portions stored therein, the computer-readable program code portions comprising executable portions configured to: identify a software alert data object for the software application framework, wherein the software alert data object is associated with one or more alert attribute data fields and a deep-learning-based alert priority score; generate, based on the one or more alert attribute data fields and using one or more alert priority score adjustment models, one or more alert priority score adjustment scores for the software alert data object; generate an alert priority score for the software alert data object based on the deep-learning-based alert priority score and the one or more alert priority score adjustment scores; generate an alert signature for the software alert data object based on the alert priority score; and perform one or more incident management actions based on the alert signature.

In accordance with yet another aspect, an apparatus comprising at least one processor and at least one memory including computer program code is provided. In one embodiment, the at least one memory and the computer program code may be configured to, with the processor, cause the apparatus to: identify a software alert data object for the software application framework, wherein the software alert data object is associated with one or more alert attribute data fields and a deep-learning-based alert priority score; generate, based on the one or more alert attribute data fields and using one or more alert priority score adjustment models, one or more alert priority score adjustment scores for the software alert data object; generate an alert priority score for the software alert data object based on the deep-learning-based alert priority score and the one or more alert priority score adjustment scores; generate an alert signature for the software alert data object based on the alert priority score; and perform one or more incident management actions based on the alert signature.

BRIEF DESCRIPTION OF THE SEVERAL VIEW OF THE DRAWINGS

Having thus described some embodiments in general terms, references will now be made to the accompanying drawings, which are not drawn to scale, and wherein:

Figure 6:
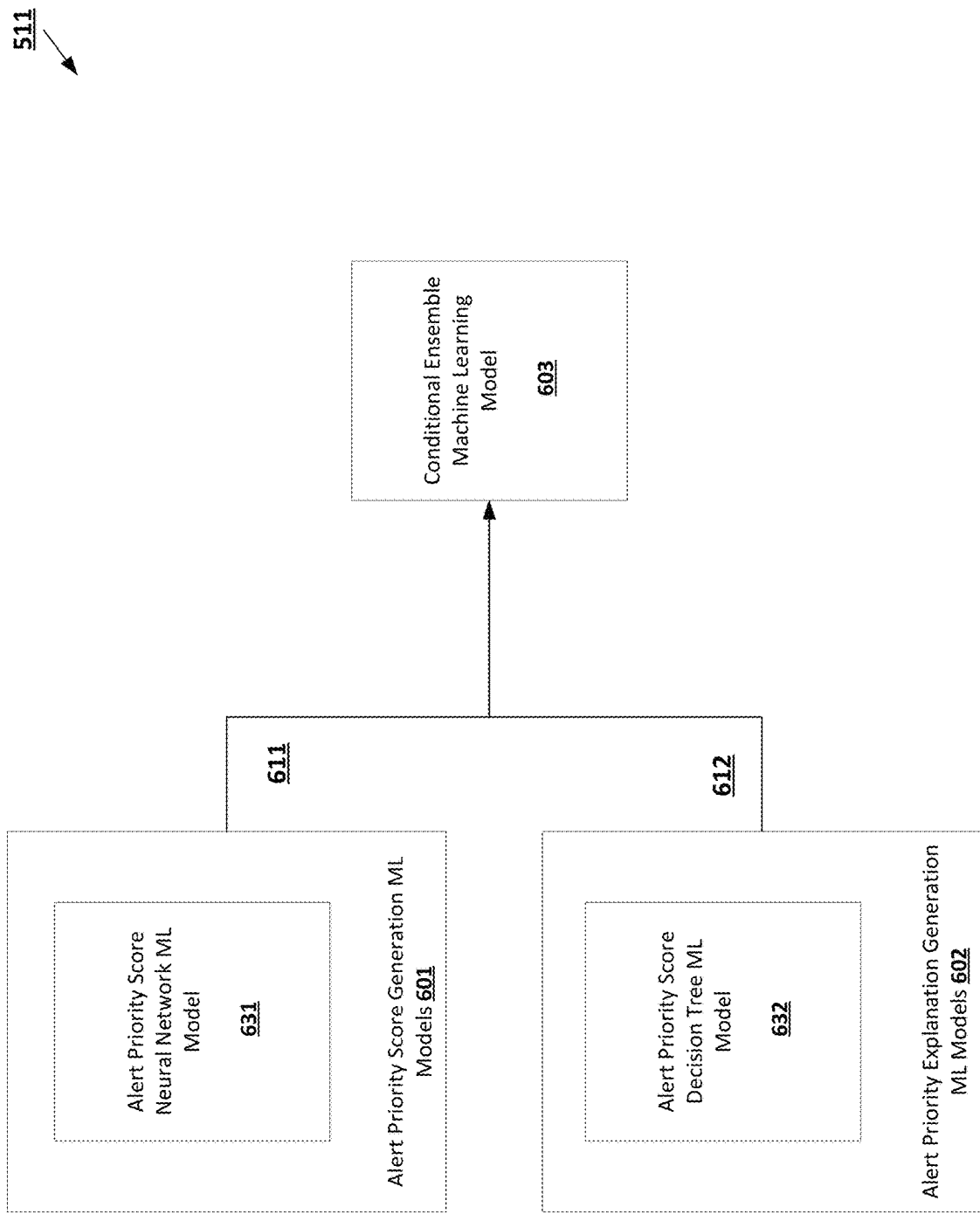

FIG. 6 provides an operational example of a conditional ensemble machine learning framework in accordance with at least some embodiments of the present invention.

Figure 7:
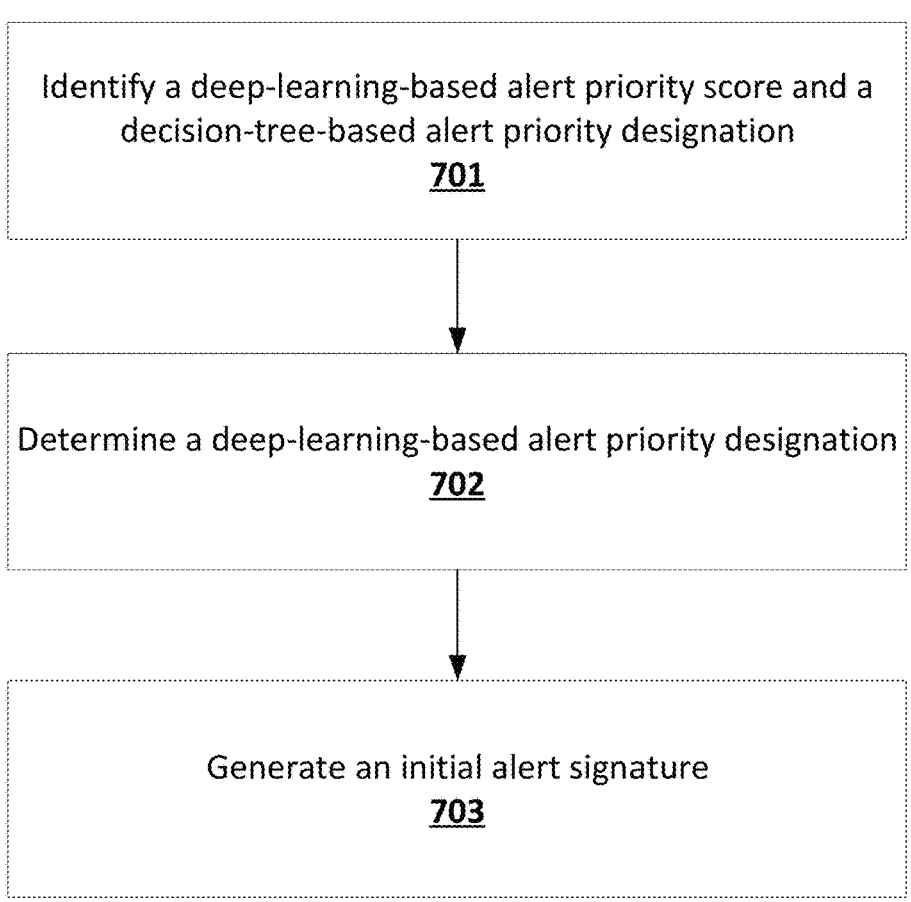

FIG. 7 is a flowchart diagram of an example process for performing operations of a conditional ensemble machine learning model in accordance with at least some embodiments of the present invention.

Figure 8:
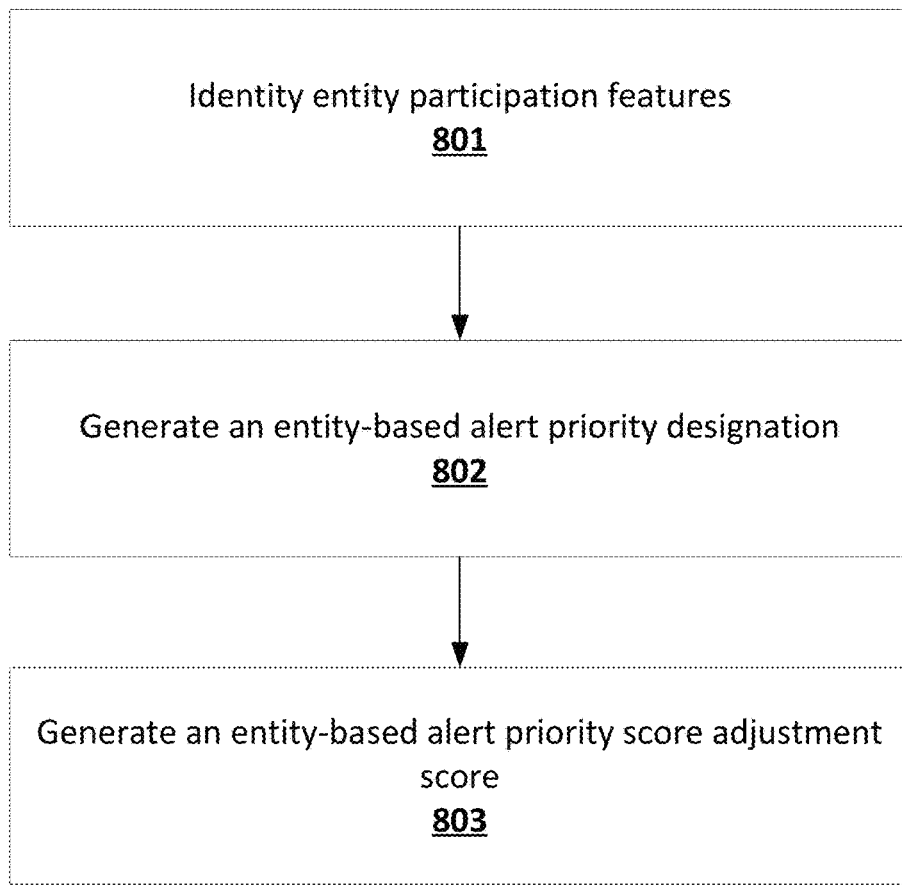

FIG. 8 is a flowchart diagram of an example process for performing operations of an entity-based alert priority score adjustment model in accordance with at least some embodiments of the present invention.

Figure 9:
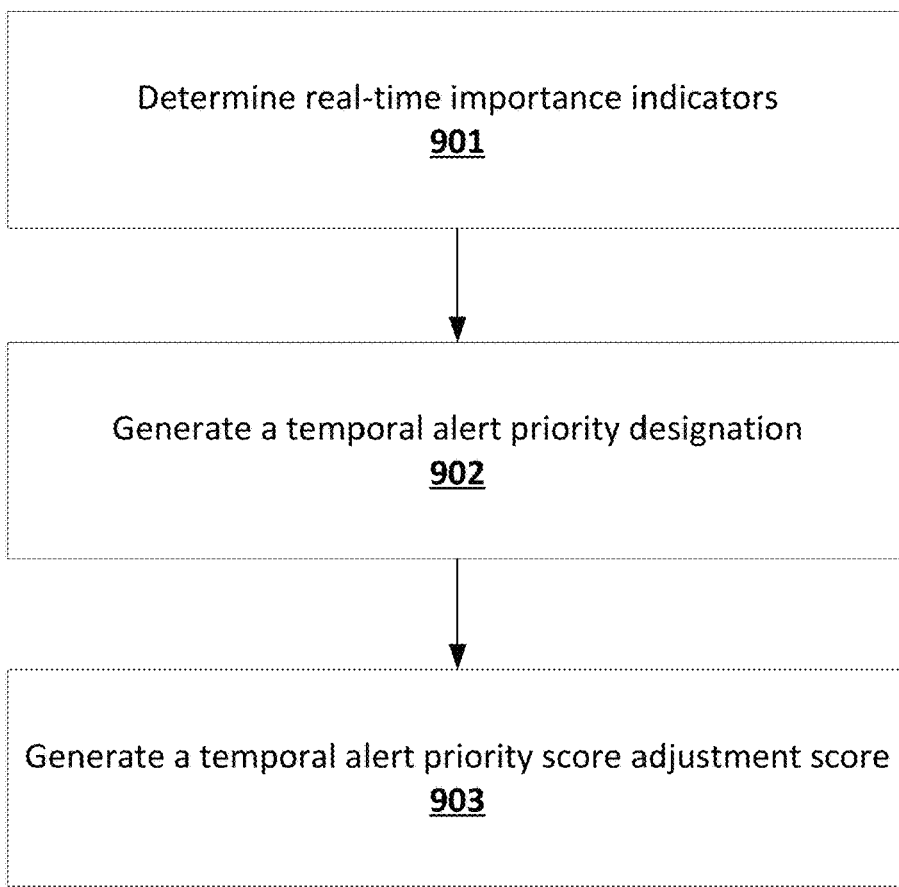

FIG. 9 is a flowchart diagram of an example process for performing operations of a temporal alert priority score adjustment model in accordance with at least some embodiments of the present invention.

Figure 10:
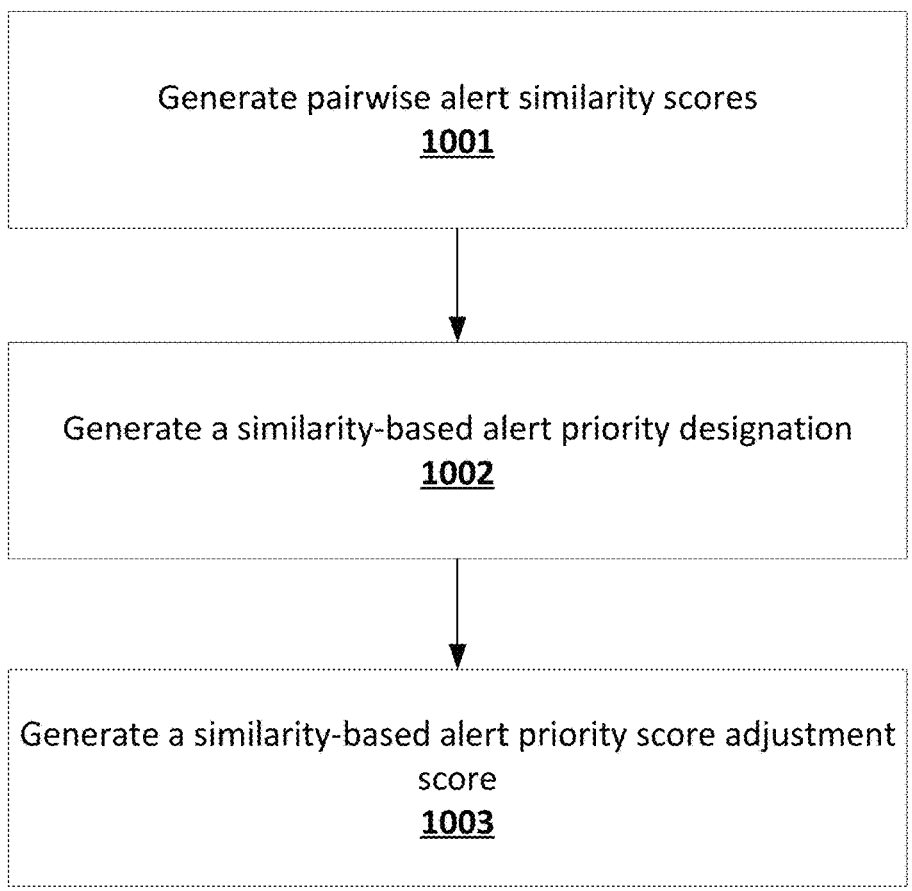

FIG. 10 is a flowchart diagram of an example process for performing operations of a similarity-based alert priority score adjustment model in accordance with at least some embodiments of the present invention.

Figure 11:
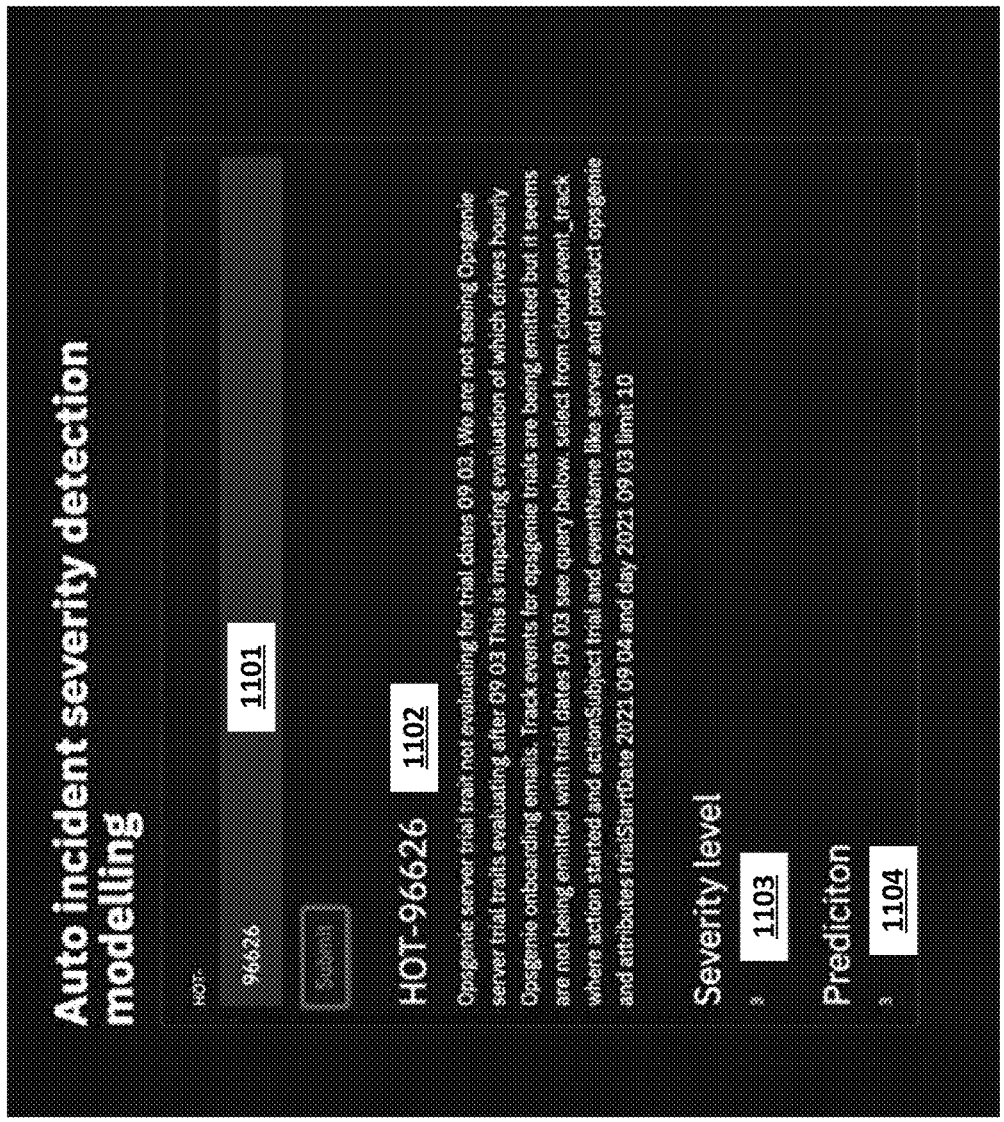

FIG. 11 provides an operational example of a user interface that depicts a predicted alert severity level and a human-generated alert severity level for a software alert data object in accordance with at least some embodiments of the present invention.

Figure 12:
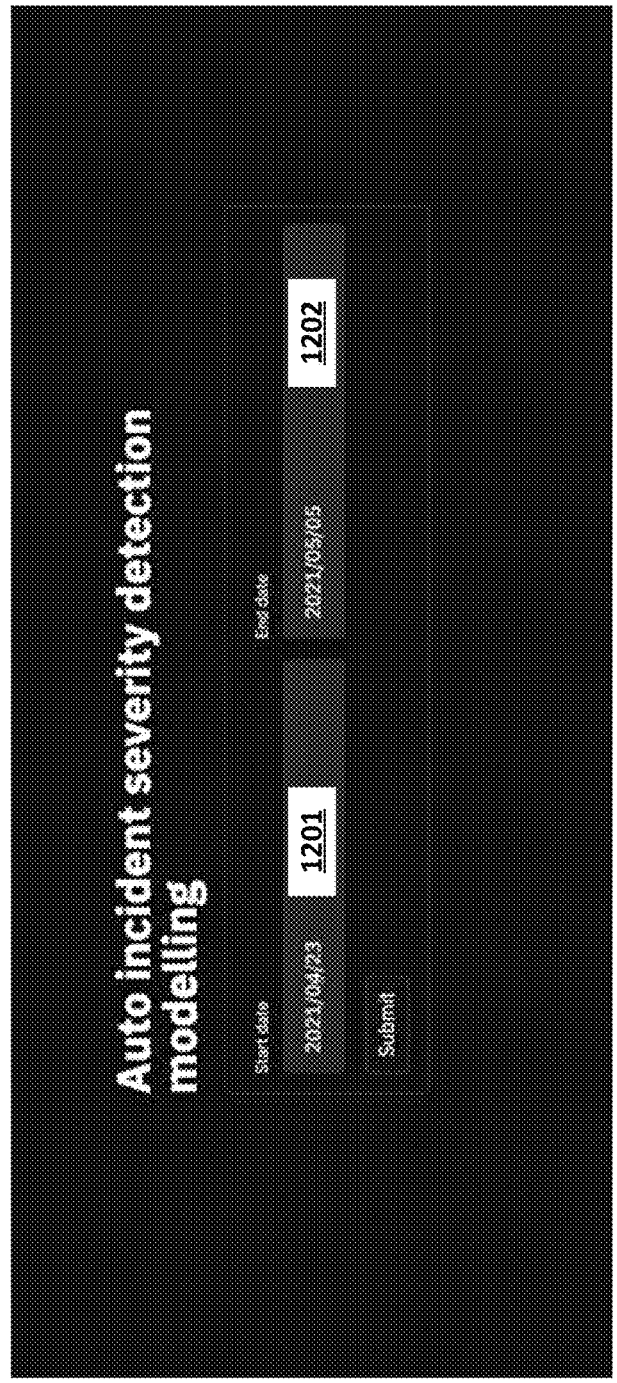

FIG. 12 provides an operational example of a user interface that enables an end user to select a date range for an alert signature in accordance with at least some embodiments of the present invention.

Figure 13:
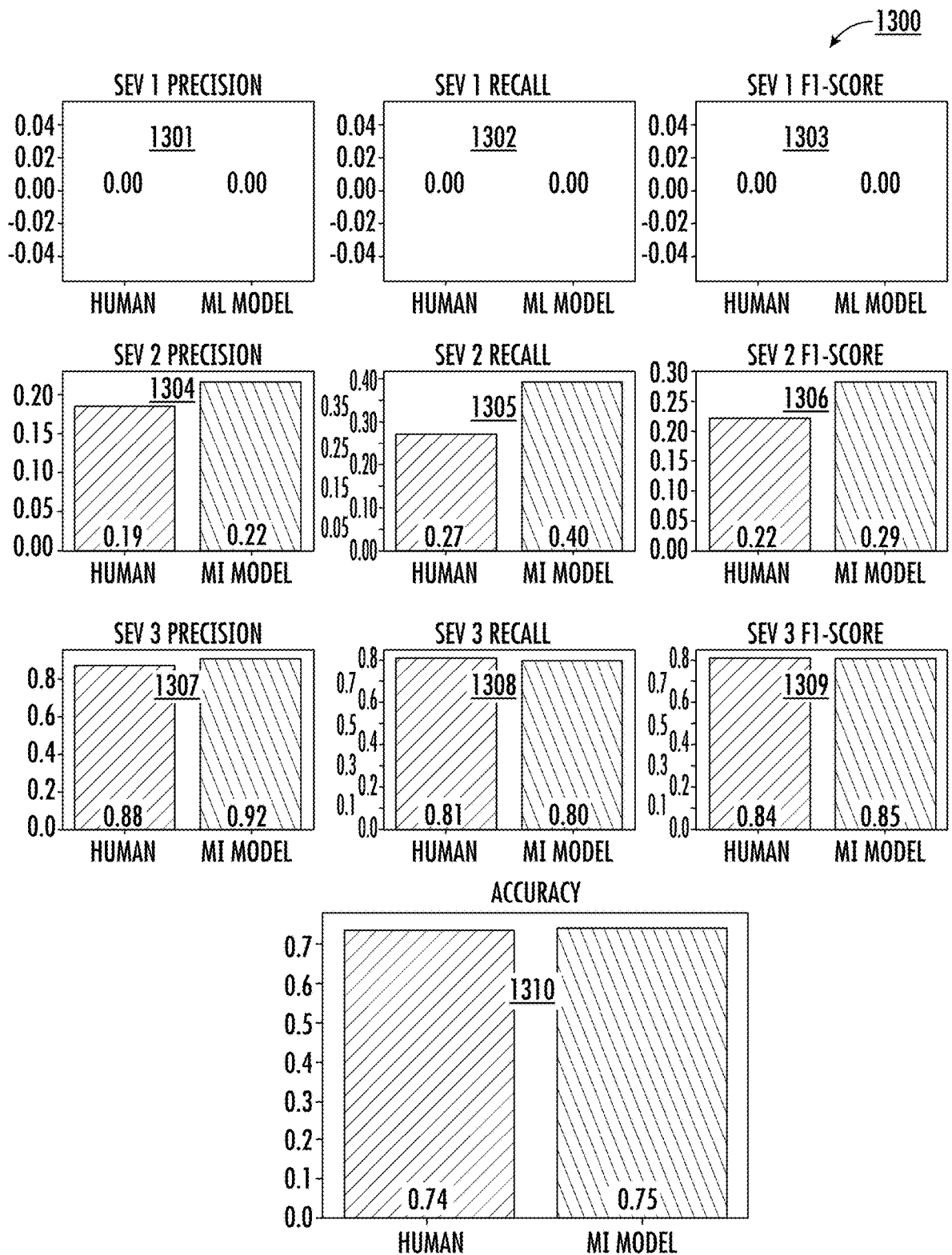

FIG. 13 provides an operational example of a user interface that displays an alert signature with recall rates, precision rates, and Fi rates for subsets of software alert data objects that are categorized based on predicted alert severity levels and human-generated alert severity levels in accordance with at least some embodiments of the present invention.

Figure 14:
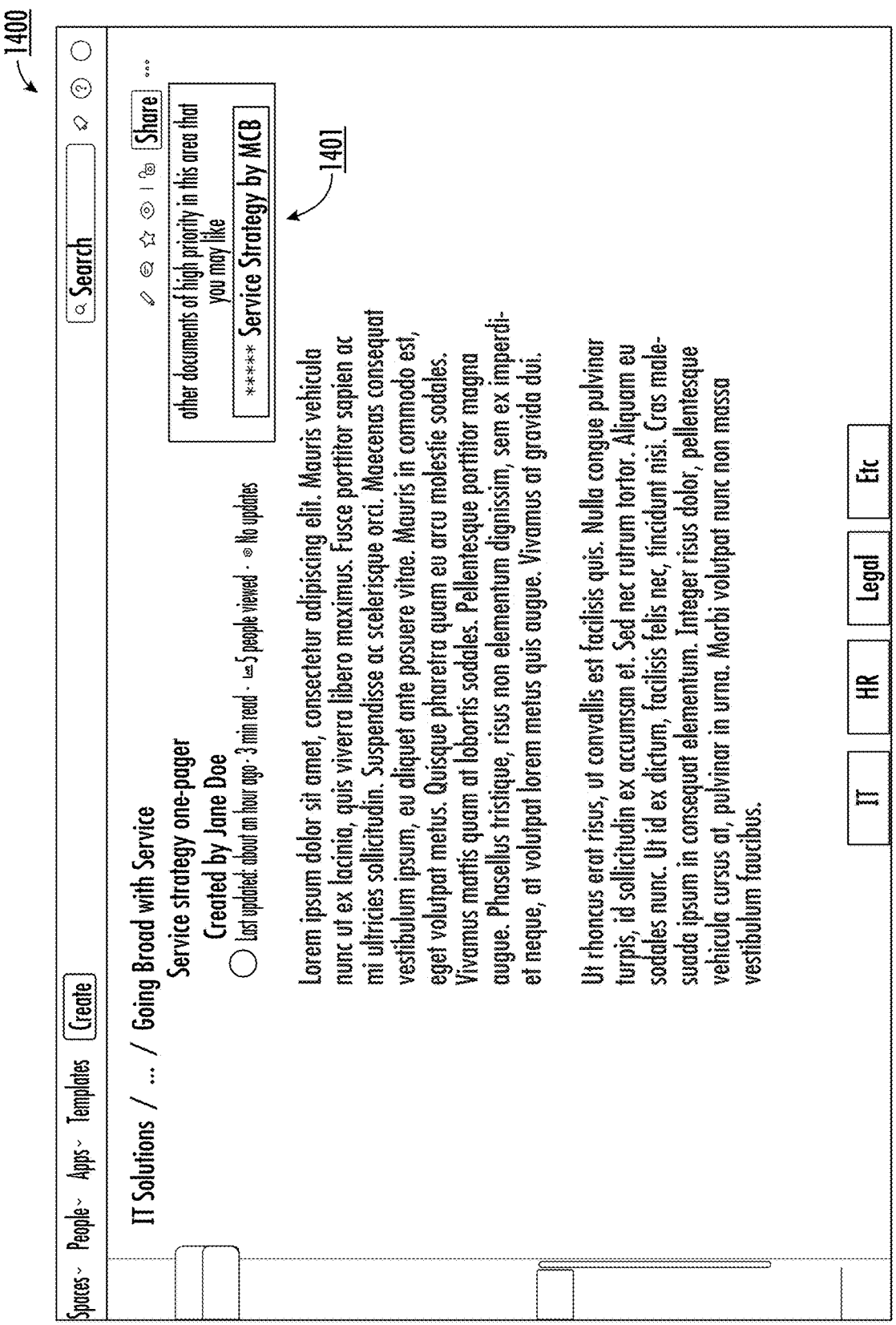

FIG. 14 provides an operational example of a document user interface that displays high-priority software alert data objects related to a document data object in accordance with at least some embodiments of the present invention.

Figure 15B:
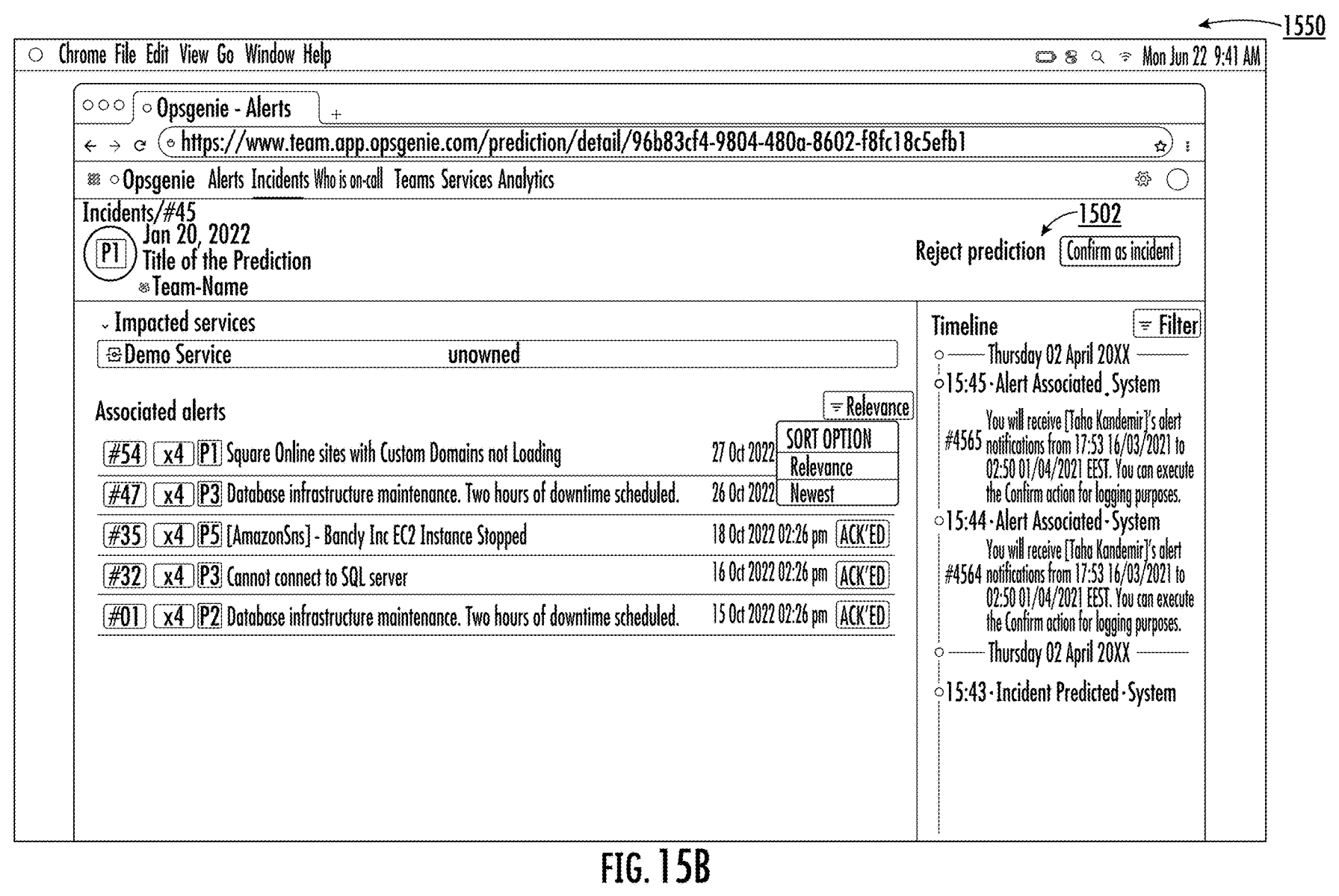

FIGS. 15A-15B provide an operational example of two incident management user interfaces in accordance with at least some embodiments of the present invention.

Figure 16:
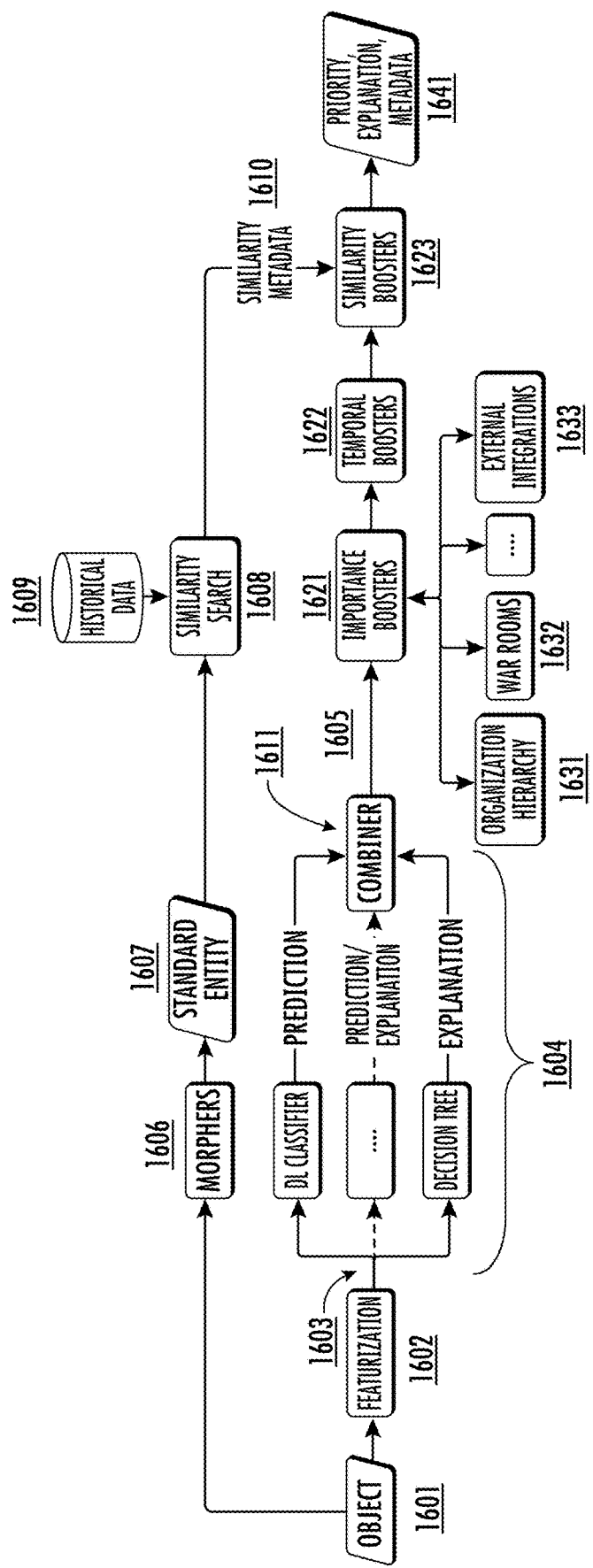

FIG. 16 provides an operational example of performing an example process for generating an alert signature for a software alert data object in accordance with at least some embodiments of the present invention.

DETAILED DESCRIPTION OF VARIOUS EMBODIMENTS

Various embodiments of the present invention now will be described more fully hereinafter with reference to the accompanying drawings in which some, but not all, embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense unless otherwise indicated. The terms "illustrative," "example," and "exemplary" are used to be examples with no indication of quality level. Like numbers refer to like elements throughout.

Overview

Various embodiments of the present invention address technical problems associated with efficiently and reliably performing predictive monitoring of complex software application frameworks. The disclosed techniques can be utilized by a software monitoring data management system to generate predictive insights that enhance effectiveness and efficiency of performing software application framework monitoring with respect to complex software application frameworks. An example of such a software monitoring data management system is the Opsgenie® incident management system provided by Atlassian PTY LTD, which enables the collection of software alert data objects for various complex software application frameworks.

A complex software application framework is typically characterized by large networks of interdependent services and microservices that support a myriad of software features and applications. Indeed, some large complex software application frameworks may be comprised of topologies of 1,500 or more interdependent services and microservices. Such complex software application frameworks are nimble, highly configurable, and enable robust collaboration and communication between users at the individual, team, and enterprise level.

Complex software application frameworks typically include large numbers of software applications. Each software application includes a number of features, with many features (e.g., user authentication features) shared between multiple software applications. Other features are supported only by one associated software application or a defined subset of software applications.

A given complex software application framework could support hundreds of software applications and hundreds of thousands of features. Those applications and features could be supported by thousands of services and microservices that exist in vast and ever-changing interdependent layers. Adding to this complexity is the fact that at any given time, a great number of software development teams may be constantly, yet unexpectedly, releasing code updates that change various software services, launch new software services, change existing features of existing software applications, add new software applications, add new features to existing software applications, and/or the like.

Individual software applications or software services may be configured to generate software alert data objects that describe a maintenance-critical state of the software applications or software services. Because of the numerosity of the software applications/services that are hosted by a complex software application framework, a large number of software alert data objects may be generated at any selected time interval. In some circumstances, a subset of the noted software alert data objects may collectively relate to a common maintenance-critical property of the complex software application framework.

For example, consider a scenario in which a first software application of a complex software application framework that is configured to perform database retrieval experiences a failure. In this scenario, in addition to the first software application, each of the frontend software applications that rely on successful data retrieval operations from a target database may generate independent software alert data objects that describe a maintenance-critical state of those frontend software applications. These frontend-generated software alert data objects, while they describe valid maintenance-critical conditions, may not be independently valuable for detecting maintenance needs of the overall complex software application framework and addressing those detected maintenance needs.

As another example, consider another scenario in which a first software application of a complex software application framework that is configured to act as a networking point for a target network experiences a failure. In this scenario, in addition to the first software application, each of the software applications that rely on successful retrieval of data using the target network may generate independent software alert data objects that describe a maintenance-critical state of those software applications. Similar to the frontend-generated software alert data objects described in relation to the previous example, the downstream-generated software alert data objects described in relation to this example may not be independently valuable for detecting maintenance needs of the overall complex software application framework and addressing those detected maintenance needs.

As the examples above illustrate, without generating predictive insights about topical relationships between software alert data objects, a software monitoring data management system will be forced to assess software alert data objects individually, which results in the need for performing additional processing operations and using unnecessary computational resources. This problem is amplified as the number of software applications, features, or services in a complex software application framework grows larger, which in turn leads to data processing problems associated with real-time processing of a large number of software alert data objects.

As the foregoing description will illustrate, a software alert approach that relies exclusively on individual processing of software alert data objects generated by software applications and software application services is not scalable. It immediately becomes highly inefficient to process software alert data objects on an individual level as the complex software application frameworks grow and dynamically change.

To address the above-described challenges related to monitoring complex software application frameworks, various embodiments of the present invention describe techniques for generating alert signatures for software alert data objects of a complex software application framework that are determined using at least one of: (i) a conditional ensemble machine learning framework comprise one or more alert priority score generation machine learning models, one or more alert priority explanation generation machine learning models, and a conditional ensemble machine learning model that is configured to generate an explanation-inclusive alert signature if a deep-learning-based alert priority score generated by the alert priority score generation machine learning models is identical to a decision-tree-based alert priority designation generated by the alert priority explanation generation machine learning models, and (ii) a set of alert priority score adjustment models such as an entity-based alert priority score adjustment model, a temporal alert priority score adjustment model, and a similarity-based alert priority score adjustment model.

By using the described techniques, various embodiments of the present invention generate predictive insights about topical relationships between software alert data objects that can be used to increase efficiency and effectiveness of software application and software service monitoring. In doing so, various embodiments of the present invention make substantial technical contributions to improving the efficiency and the effectiveness of monitoring complex software application frameworks.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client computing device" refers to a combination of computer hardware and/or software that is configured to access a service made available by a server. The server is often, but not always, on another computer system, in which case the client accesses the service by way of a network. Client computing devices may include, without limitation, smart phones, tablet computers, laptop computers, wearables, personal computers, enterprise computers, and the like.

The term "server computing device" refers to a combination of computer hardware and/or software that is configured to provide a service to a client device. An example of a server computing device is the software monitoring data management computing device 106 of FIG. 1. In some embodiments, a server computing device communicates with one or more client computing devices using one or more computer networks.

The term "software alert data object" refers to a data construct that is generated by a software application monitoring computing device and transmitted to a software monitoring data management computing device. The software alert data object is configured to describe one or more properties associated with execution, maintenance, configuration management and/or external integration of a software application framework being monitored by the software application monitoring computing device. For example, the software alert data object may describe one or more execution properties associated with execution and/or operation of a software application framework being monitored by the software application monitoring computing device during a maintenance-critical state (e.g., a software failure state) of the software application framework. In some embodiments, a software alert data object describes an alert, which may be generated when a software application monitoring computing device detects a maintenance-critical state of a software application framework. In some embodiments, a software alert data object describes an incident, which may be an unplanned interruption to a service or reduction in the quality of a service or a failure of a software application framework. In some embodiments, a software alert data object is generated based on data (e.g., communication data) transmitted from an external system that is integrated with the software application framework, such as from the Amazon Simple Email Service (SES) system, the Amazon Simple Notification Service (Amazon SNS) system, a videoconferencing software application, and/or the like. While various embodiments of the present invention describe generating various scores/designations for a single software alert data object, a person of ordinary skill in the relevant technology will recognize that scores/designations described herein may be generated for a sequence of software alert data objects to generate a predicted likelihood of the sequence is associated with a high-priority software incident data object.

The term "software incident data object" refers to a data construct that is generated by a software application monitoring computing device and transmitted to a software monitoring data management computing device. The software incident data object describes a recognized/registered software incident associated with a monitored software application framework, such as a software incident that is determined based on a set of software alert data objects associated with the monitored software application framework. In some embodiments, the software incident data object is associated with a team identifier for a software development/maintenance team that is associated with handling the software incident, a component identifier for a software component of the monitored software application framework that is affected by the software incident, and/or a set of software alert data objects that are associated with the software alert data object based on one or more user annotations about associations between software alert data objects and software incident data objects (e.g., as entered using the Opsgenie® incident management system) and/or based on one or more alert-incident association heuristics.

The term "alert classification neural network machine learning model" refers to a data construct that is generated by a training engine of a software monitoring data management computing device of a software monitoring data management system using training data stored on a training data storage unit of the storage subsystem of the software monitoring data management system. Once generated, the alert classification neural network machine learning model is stored as part of a model configuration data storage unit of the storage subsystem. When invoked, the model execution engine of the software monitoring data management computing device executes operations defined by the alert classification neural network machine learning model with respect to alert attribute data fields of a software alert data object and in accordance with the trained parameters of the alert classification neural network machine learning model to generate output data that can be used to generate a deep-learning-based alert priority designation for the software alert data object. The alert classification neural network machine learning model comprises a set of neural network layers that are collectively configured to process the output data by processing alert attribute data fields associated with a software alert data object. In some embodiments, the set of neural network layers are configured to generate a deep-learning-based alert priority score for the software alert data object based on the alert attribute data fields associated with the software alert data object, and the deep-learning-based alert priority designation for the software alert data object based on whether the deep-learning-based alert priority score for the software alert data object satisfies (e.g., exceeds) a deep-learning-based alert priority score threshold. For example, in some embodiments, if the deep-learning-based alert priority score for the software alert data object satisfies a deep-learning-based alert priority score threshold, the software alert data object is assigned an affirmative deep-learning-based alert priority designation, while if the deep-learning-based alert priority score for the software alert data object fails to satisfy a deep-learning-based alert priority score threshold, the software alert data object is assigned a negative deep-learning-based alert priority designation.

The term "deep-learning-based alert priority designation" refers to a data construct that is generated by a model execution engine of a software monitoring data management computing device and stored as part of a storage subsystem of a software monitoring data management system. The deep-learning-based alert priority designation describes a label that is assigned to a corresponding software alert data object that is determined based on a computed/predicted likelihood that the corresponding software alert data object is related to at least one software incident data object as generated by an alert classification neural network machine learning model. The deep-learning-based alert priority designation is generated based on output data (e.g., a deep-learning-based alert priority score) that is generated by the alert classification neural network machine learning model based on processing the alert attribute data fields associated with the corresponding software alert data object. For example, in some embodiments, the alert classification neural network machine learning model is configured to generate a deep-learning-based alert priority score for the software alert data object based on the alert attribute data fields associated with the software alert data object, and the deep-learning-based alert priority designation for the software alert data object based on whether the deep-learning-based alert priority score for the software alert data object satisfies (e.g., exceeds) a deep-learning-based alert priority score threshold. For example, in some embodiments, if the deep-learning-based alert priority score for the software alert data object satisfies a deep-learning-based alert priority score threshold, the software alert data object is assigned an affirmative deep-learning-based alert priority designation, while if the deep-learning-based alert priority score for the software alert data object fails to satisfy a deep-learning-based alert priority score threshold, the software alert data object is assigned a negative deep-learning-based alert priority designation. In some embodiments, at least one of the deep-learning-based alert priority designation or the deep-learning-based alert priority score for a software alert data object are provided as inputs to a conditional ensemble machine learning model. In some embodiments, the particular deep-learning-based alert priority designation that is selected from a set of decision-tree-based alert priority designations (e.g., a set of alert priority designations comprising an affirmative alert priority designation that is assigned to software alert data objects that are predicted to be likely to be related to a software incident data object and a negative alert priority designation that is assigned to software alert data objects that are predicted to be likely to be unrelated to a software incident data object; a set of alert priority designations comprising a high alert priority designation that is assigned to software alert data objects that are predicted to be highly likely to be related to a software incident data object, a medium alert priority designation that is assigned to software alert data objects that are predicted to be moderately likely to be related to a software incident data object, and a low alert priority designation that is assigned to software alert data objects that are predicted to be marginally likely to be related to a software incident data object; and/or the like).

The term "deep-learning-based alert priority score" refers to a data construct that is generated by a model execution engine of a software monitoring data management computing device and stored as part of a storage subsystem of a software monitoring data management system. The deep-learning-based alert priority score describes a computed/predicted likelihood that a corresponding software alert data object is related to at least one software incident data object as generated by an alert classification neural network machine learning model. The deep-learning-based alert priority score is generated by the alert classification neural network machine learning model based on processing the alert attribute data fields associated with the corresponding software alert data object. In some embodiments, the deep-learning-based alert priority score for a software alert data object is used to generate a deep-learning-based alert priority designation for the software alert data object. In some embodiments, because the deep-learning-based alert priority score is generated by a set of neural network layers characterized by a set of trained neural network parameters, the deep-learning-based alert priority score is an uninterpretable prediction about the computed/predicted likelihood that a corresponding software alert data object is related to at least one software incident data object because the structure of the neural network architecture fails to provide predictive insights about why a particular deep-learning-based alert priority score is generated for a particular software incident data object. In some of the noted embodiments, because of this limitation of the deep-learning-based alert priority scores generated by an alert classification neural network machine learning model, a conditional ensemble machine learning model is configured to generate whether the particular deep-learning-based alert priority score can be mapped to a decision-tree-based alert priority designation and may, in response to determining that the particular deep-learning-based alert priority score can be mapped to a decision-tree-based alert priority designation, generate explanatory metadata for the deep-learning-based alert priority score based on the decision-tree-based alert priority designation (e.g., based on a tree traversal sequence associated with generating the decision-tree-based alert priority designation). In some embodiments, the deep-learning-based alert priority score for one or more software alert data objects describes a prediction about whether the one or more software alert data objects are associated with a high-priority software incident data object.

The term "alert classification decision tree machine learning model" refers to a data construct that is generated by a training engine of a software monitoring data management computing device of a software monitoring data management system using training data stored on a training data storage unit of the storage subsystem of the software monitoring data management system. Once generated, the alert classification decision tree machine learning model is stored as part of a model configuration data storage unit of the storage subsystem. When invoked, the model execution engine of the software monitoring data management computing device executes operations defined by the alert classification decision tree machine learning model with respect to alert attribute data fields of a software alert data object and in accordance with a generated decision tree structure of the alert classification decision tree machine learning model to generate a decision-tree-based alert priority designation for the software alert data object. Accordingly, the alert classification decision tree machine learning model comprises a decision tree structure having a set of defined hierarchical relationships associated with a set of decision tree nodes, where each decision tree node may correspond to a condition that is defined based on a set of alert attribute data fields that are associated with the condition. For example, a root decision tree node may specify a condition requiring that the team identifier of a given software alert data object belong to a defined set of team identifiers. In some embodiments, given the noted root decision tree node, if a given software alert data object satisfies the noted condition (i.e., if the team identifier of the given software alert data object is in the defined set), processing of the given software alert data object using the alert classification decision tree machine learning model comprises processing the given software alert data object using an associated branch (e.g., a left branch) of the decision tree structure and using a root decision tree node of the associated branch, while if the given software alert data object fails to satisfy the noted condition (i.e., if the team identifier of the given software alert data object is not in the defined set), processing of the given software alert data object using the alert classification decision tree machine learning model comprises processing the given software alert data object using an associated branch (e.g., a right branch) of the decision tree structure and using a root decision tree node of the associated branch.

The term "decision-tree-based alert priority designation" refers to a data construct that is generated by a model execution engine of a software monitoring data management computing device and stored as part of a storage subsystem of a software monitoring data management system. The decision-tree-based alert priority designation describes a label that is assigned to a corresponding software alert data object that is determined based on output data generated by the alert classification decision tree machine learning model via processing the alert attribute data fields associated with the corresponding software alert data object. In some embodiments, processing a software alert data object using an alert classification decision tree machine learning model leads to traversal to a leaf node of the decision tree structure that is associated with the alert classification decision tree machine learning model, where the leaf node is associated with output data that can be used to generate the decision-tree-based alert priority designation for the software alert data object. For example, in some embodiments, the traversed leaf node for a software alert data object is associated with a decision-tree-based alert priority score. In some of the noted embodiments, if the decision-tree-based alert priority score satisfies (e.g., exceeds) a decision-tree-based alert priority score threshold, then the software alert data object is assigned an affirmative decision-tree-based alert priority designation, while if the decision-tree-based alert priority score fails to the decision-tree-based alert priority score threshold, then the software alert data object is assigned a negative decision-tree-based alert priority designation. As another example, in some embodiments, the traversed leaf node for a software alert data object is associated with a particular decision-tree-based alert priority designation that is selected from a set of decision-tree-based alert priority designations (e.g., a set of alert priority designations comprising an affirmative alert priority designation that is assigned to software alert data objects that are predicted to be likely to be related to a software incident data object and a negative alert priority designation that is assigned to software alert data objects that are predicted to be likely to be unrelated to a software incident data object; a set of alert priority designations comprising a high alert priority designation that is assigned to software alert data objects that are predicted to be highly likely to be related to a software incident data object, a medium alert priority designation that is assigned to software alert data objects that are predicted to be moderately likely to be related to a software incident data object, and a low alert priority designation that is assigned to software alert data objects that are predicted to be marginally likely to be related to a software incident data object; and/or the like).

The term "conditional ensemble machine learning model" may refer to a data construct that is stored as part of a model configuration data storage unit of the storage subsystem. When invoked, the model execution engine of the software monitoring data management computing device executes operations defined by the conditional ensemble machine learning model with respect to a corresponding software alert data object to generate an alert signature for the corresponding software alert data object. In some embodiments, the conditional ensemble machine learning model is configured to generate the alert signature for a software alert data object based on whether the deep-learning-based alert priority designation for the software alert data object and the decision-tree-based alert priority designation for the software alert data object are identical. In some of the noted embodiments, if the conditional ensemble machine learning model determines that the deep-learning-based alert priority designation for the software alert data object and the decision-tree-based alert priority designation for the software alert data object are identical, the conditional ensemble machine learning model may generate the alert signature for the software alert data object to describe both data associated with the deep-learning-based alert priority designation (e.g., the deep-learning-based alert priority score for the software alert data object that is used to generate the deep-learning-based alert priority designation) and explanatory metadata for the software alert data object that is generated based on the tree traversal sequence for the software alert data object. In some embodiments, if the conditional ensemble machine learning model determines that the deep-learning-based alert priority designation for the software alert data object and the decision-tree-based alert priority designation for the software alert data object are different, the conditional ensemble machine learning model may generate the alert signature for the software alert data object to describe only data associated with the deep-learning-based alert priority designation (e.g., the deep-learning-based alert priority score for the software alert data object that is used to generate the deep-learning-based alert priority designation), but not the explanatory metadata for the software alert data object that is generated based on the tree traversal sequence for the software alert data object. For example, in an exemplary embodiment in which a software alert data object is associated with a deep-learning-based alert priority score of 0.6 and an affirmative deep-learning-based alert priority designation, given a deep-learning-based alert priority score threshold of 0.5, the conditional ensemble machine learning model may: (i) determine that the software alert data object is associated with an affirmative deep-learning-based alert priority designation given that the deep-learning-based alert priority score of 0.6 satisfies (in this case, exceeds) the deep-learning-based alert priority threshold of 0.5, and (ii) because the deep-learning-based alert priority designation and the decision-tree-based alert priority designation both describe an affirmative alert priority designation, generate an alert signature for the software alert data object that describes the deep-learning-based alert priority score of 0.6 and explanatory metadata associated with the tree traversal sequence used to generate the affirmative decision-tree-based alert priority designation. As another example, in an exemplary embodiment in which a software alert data object is associated with a deep-learning-based alert priority score of 0.4 and an affirmative deep-learning-based alert priority designation, given a deep-learning-based alert priority score threshold of 0.5, the conditional ensemble machine learning model may: (i) determine that the software alert data object is associated with a negative deep-learning-based alert priority designation given that the deep-learning-based alert priority score of 0.4 does not satisfy (in this case, does not exceed) the deep-learning-based alert priority threshold of 0.5, and (ii) because the deep-learning-based alert priority designation is a negative alert priority designation while and the decision-tree-based alert priority designation is an affirmative alert priority designation (i.e., because the two alert priority designations are different), generate an alert signature for the software alert data object that describes the deep-learning-based alert priority score of 0.6 but not explanatory metadata associated with the tree traversal sequence used to generate the negative decision-tree-based alert priority designation.

The term "tree traversal sequence" refers to a data construct that is generated by a model execution engine of a software monitoring data management computing device and stored as part of a storage subsystem of a software monitoring data management system. The tree traversal sequence describes the set of decision tree nodes and/or the set of decision tree links/edges of a decision tree structure of an alert classification decision tree machine learning model that are visited/traversed by the alert classification decision tree machine learning model when processing a corresponding software alert data object. For example, if the decision tree structure of an alert classification decision tree machine learning model comprises a root decision tree nodes that tests for a first condition that is satisfied when the team identifier of a given software alert data object falls within a set of qualifying team identifiers, and if upon satisfaction of the first condition the given software alert data object is processed using a left decision tree branch whose root decision tree node tests for a second condition that is satisfied when the timestamp of a given software alert data object falls within a qualifying time range, then assuming that the team identifier for a particular software alert data object falls within the set of qualifying team identifiers and that the timestamp of the particular software alert data object falls within the qualifying time range, then the tree traversal sequence for the particular software alert data object may describe at least one of the following: (i) the root decision tree node, (ii) the leftward link/edge of the root decision tree node, or (iii) the root decision tree node of the right decision tree branch. As described below, the tree traversal sequence that is associated with processing a software alert data object using the decision tree structure of an alert classification decision tree machine learning model may be used to generate explanatory metadata associated with the noted software alert data object.

The term "explanatory metadata" refers to a data construct that is generated by a model execution engine of a software monitoring data management computing device and stored as part of a storage subsystem of a software monitoring data management system. The explanatory metadata refers to an automatically-generated explanation for why a decision-tree-based alert priority designation for a software alert data object is generated, where the automatically-generated explanation is generated based on the tree traversal sequence for the software alert data object as generated by an alert classification decision tree machine learning model via processing alert attribute features associated with the software alert data object in accordance with the decision tree structure of the alert classification decision tree machine learning model. For example, as described above, if the decision tree structure of an alert classification decision tree machine learning model comprises a root decision tree nodes that tests for a first condition that is satisfied when the team identifier of a given software alert data object falls within a set of qualifying team identifiers, and if upon satisfaction of the first condition the given software alert data object is processed using a left decision tree branch whose root decision tree node tests for a second condition that is satisfied when the timestamp of a given software alert data object falls within a qualifying time range, then assuming that the team identifier for a particular software alert data object falls within the set of qualifying team identifiers and that the timestamp of the particular software alert data object falls within the qualifying time range, then the tree traversal sequence for the particular software alert data object may describe at least one of the following: (i) the root decision tree node, (ii) the leftward link/edge of the root decision tree node, or (iii) the root decision tree node of the right decision tree branch. In this example, if the decision-tree-based alert priority designation for the software alert data object as generated in accordance with the value assigned to a leaf decision tree node of the tree traversal sequence is an affirmative decision-tree-based alert priority designation, the explanatory metadata for the software alert data object may describe, in structured format, that the software alert data object is assigned an affirmative decision-tree-based alert priority designation in part because the team identifier of the software alert data object falls within the set of qualifying team identifiers and the timestamp of the software alert data object falls within the qualifying time range. In some embodiments, the explanatory metadata may be used by a conditional ensemble machine learning model to generate an alert signature for the software alert data object if the deep-learning-based alert priority designation for the software alert data object and the decision-tree-based alert priority designation for the software alert data object both describe an identical alert priority designation.

The term "alert priority score adjustment model" may refer to a data construct that is stored as part of a model configuration data storage unit of the storage subsystem. When invoked, the model execution engine of the software monitoring data management computing device executes operations defined by the alert priority score adjustment model with respect to a corresponding software alert data object to generate an alert signature for the corresponding software alert data object. In some embodiments, the alert priority score adjustment model is configured to: (i) determine whether alert attribute data fields for a software alert data object satisfy a condition of a set of conditions associated with the alert priority score adjustment model, where each condition is associated with an alert priority score adjustment score, and (ii) if the software alert data object satisfies a particular condition, then assign the alert priority score adjustment model for the particular condition to the software alert data object. For example, a particular alert priority score adjustment model may be configured to determine whether a current team status of a team identifier for the software alert data object indicates a critical team condition, and if so assign a corresponding priority score adjustment score (e.g., a priority score adjustment score of 0.05) to the software alert data objects. In some embodiments, given M alert priority score adjustment models, a software alert data object may be assigned up to M alert priority score adjustment scores, where the assigned alert priority score adjustment scores may be combined (e.g., added) to an unadjusted alert priority score (e.g., a deep-learning-based alert priority score) for the software alert data object to generate an adjusted alert priority score for the software alert data object. In some embodiments, a particular alert priority score adjustment score that is assigned to a software alert data object by a particular alert priority score adjustment model may be a negative or a positive value. In some embodiments, when the particular alert priority score adjustment score is a positive non-zero value, then the particular alert priority score adjustment score may be deemed to be a "boosting" score and the particular alert priority score adjustment model may be deemed to be a "booster" predictive model. Examples of alert priority score adjustment models comprise an entity-based alert priority score adjustment model, a temporal alert priority score adjustment model, and a similarity-based alert priority score adjustment model.

The term "entity-based alert priority score adjustment model" may refer to a data construct that is stored as part of a model configuration data storage unit of the storage subsystem. When invoked, the model execution engine of the software monitoring data management computing device executes operations defined by the entity-based alert priority score adjustment model with respect to a corresponding software alert data object to generate an alert signature for the corresponding software alert data object. In some embodiments, the alert priority score adjustment model is configured to: (i) map a software alert data object to an entity-based alert priority designation based on one or more entity participation features for the software alert data object, and (ii) assign an alert priority adjustment score that is associated with the entity-based alert priority designation (referred to herein as an entity-based alert priority score adjustment score) to the software alert data object. In some embodiments, the entity-based alert priority score adjustment model defines one or more conditions, where each condition is satisfied when the entity participation features of a given software alert data object satisfy particular requirements, and where each condition is associated with an entity-based alert priority designation having a respective entity-based alert priority score adjustment score. For example, an entity-based alert priority score adjustment model may be associated with a condition that is satisfied when a given software alert data object has an affirmative superior participant indicator, where, if the given software alert data object satisfies the condition, the given software alert data object is assigned a respective entity-based alert priority designation and the entity-based alert priority score adjustment score for the respective entity-based alert priority designation. As another example, an entity-based alert priority score adjustment model may be associated with a condition that is satisfied when the average seniority level of participant profiles associated with a software alert data object satisfies an a superiority level threshold, where, if the given software alert data object satisfies the condition, the given software alert data object is assigned a respective entity-based alert priority designation and the entity-based alert priority score adjustment score for the respective entity-based alert priority designation.

The term "temporal alert priority score adjustment model" may refer to a data construct that is stored as part of a model configuration data storage unit of the storage subsystem. When invoked, the model execution engine of the software monitoring data management computing device executes operations defined by the temporal alert priority score adjustment model with respect to a corresponding software alert data object to generate an alert signature for the corresponding software alert data object. In some embodiments, the temporal alert priority score adjustment model is configured to: (i) map a software alert data object to a temporal alert priority designation based on one or more real-time operational features of a current operational state of a corresponding software application framework that is associated with the software alert data object, and (ii) assign an alert priority adjustment score that is associated with the temporal alert priority designation (referred to herein as a temporal alert priority score adjustment score) to the software alert data object. In some embodiments, the temporal alert priority score adjustment model defines one or more conditions, where each condition is satisfied when real-time importance indicators for alert attribute data fields of the software alert data object satisfy particular requirements, and where each condition is associated with a temporal alert priority designation having a respective temporal alert priority score adjustment score. For example, a temporal alert priority score adjustment model may be associated with a condition that is satisfied when a team identifier of a given software alert data object is associated with a real-time importance indicator that describes that the particular team is currently in a critical condition, where, if the given software alert data object satisfies the condition, the given software alert data object is assigned a respective temporal alert priority designation and the temporal alert priority score adjustment score for the respective temporal alert priority designation. As another example, a temporal alert priority score adjustment model may be associated with a condition that is satisfied when at least one of module/component/subsystem identifiers of a given software alert data object (that describes which modules/components/subsystems of a corresponding software application framework are affected by the given software alert data object) is associated with a real-time importance indicator that describes that the particular affected module/component/subsystem is currently in a critical condition, where, if the given software alert data object satisfies the condition, the given software alert data object is assigned a respective temporal alert priority designation and the temporal alert priority score adjustment score for the respective temporal alert priority designation.

The term "similarity-based alert priority score adjustment model" may refer to a data construct that is stored as part of a model configuration data storage unit of the storage subsystem. When invoked, the model execution engine of the software monitoring data management computing device executes operations defined by the similarity-based alert priority score adjustment model with respect to a corresponding software alert data object to generate an alert signature for the corresponding software alert data object. In some embodiments, the similarity-based alert priority score adjustment model is configured to: (i) for each historical software alert data object of a plurality of historical software alert data objects that is associated with a historical alert priority score, generate a pairwise alert similarity score with respect to the software alert data object, (ii) generate a similarity-based alert priority designation for the software alert data object based on each historical alert priority score and each pairwise alert similarity, and (iii) generate a similarity-based alert priority score adjustment score for the software alert data object based on the similarity-based alert priority designation.

The term "alert signature" refers to a data construct that is generated by a model execution engine of a software monitoring data management computing device and stored as part of a storage subsystem of a software monitoring data management system. The alert signature of a software alert data object describes a set of alert classification scores for the software alert data object, where each alert classification score describes a computed/predicted likelihood that the software alert data object is related to at least one software incident data object of a corresponding monitored software application framework. For example, the alert signature for a software alert data object may be determined based on at least one of the first-order alert classification scores for the software alert data object, temporal-sequential alert classification score for the software alert data object, one or more categorical-sequential alert classification scores for the software alert data object, the attention-based alert classification score for the software alert data object, and/or the like. In some embodiments, the alert signature for a software alert data object is processed by a second-order alert classification machine learning model to generate a second-order alert classification score for the software alert data object.

The term "entity participation feature" refers to a data construct that is generated by a model execution engine of a software monitoring data management computing device and stored as part of a storage subsystem of a software monitoring data management system. An entity participation feature describes at least one property (e.g., a seniority/superiority/importance level property) of at least one participant profile for the software data object. The participant profiles for the software alert data object may include user profiles and/or team profiles that are tagged on an alert entry for a software alert data object, that are part of multi-party communication platforms/channels associated with the software alert data object (e.g., associated with a team identifier for the software alert data object), that are invited to and/or participate in audioconferencing/videoconferencing events associated with the software alert data object, and/or the like). An example of an entity participation feature for a software alert data object is a superior participant indicator that describes whether a required number (e.g., one) and/or a required ratio of participant profiles for a software alert data object are associated with a superiority/seniority/importance designation. For example, in some embodiments, if a software alert data object is associated with at least one senior/superior/important participant profile, the software alert data object is assigned an affirmative superior participant profile. Another example of entity participation feature for a software alert data object is an entity participation feature that is determined based on whether the average seniority level of participant profiles associated with a software alert data object satisfies a superiority level threshold.

The term "entity-based alert priority designation" refers to a data construct that is generated by a model execution engine of a software monitoring data management computing device and stored as part of a storage subsystem of a software monitoring data management system. An entity-based alert priority designation describes a condition satisfied by the one or more entity participation features for a software alert data object. In some embodiments, the entity-based alert priority score adjustment model defines one or more conditions, where each condition is satisfied when the entity participation features of a given software alert data object satisfy particular requirements, and where each condition is associated with an entity-based alert priority designation having a respective entity-based alert priority score adjustment score. For example, an entity-based alert priority score adjustment model may be associated with a condition that is satisfied when a given software alert data object has an affirmative superior participant indicator, where, if the given software alert data object satisfies the condition, the given software alert data object is assigned a respective entity-based alert priority designation. As another example, an entity-based alert priority score adjustment model may be associated with a condition that is satisfied when the average seniority level of participant profiles associated with a software alert data object satisfies a superiority level threshold, where, if the given software alert data object satisfies the condition, the given software alert data object is assigned a respective entity-based alert priority designation.

The term "entity-based alert priority score adjustment score" refers to a data construct that is generated by a model execution engine of a software monitoring data management computing device and stored as part of a storage subsystem of a software monitoring data management system. The entity-based alert priority score adjustment score describes an alert priority score that is assigned to the software alert data object based on the entity-based alert priority designation for the software alert data object. For example, an entity-based alert priority score adjustment model may be associated with a condition that is satisfied when a given software alert data object has an affirmative superior participant indicator, where, if the given software alert data object satisfies the condition, the given software alert data object is assigned a respective entity-based alert priority designation and the entity-based alert priority score adjustment score for the respective entity-based alert priority designation. As another example, an entity-based alert priority score adjustment model may be associated with a condition that is satisfied when the average seniority level of participant profiles associated with a software alert data object satisfies an a superiority level threshold, where, if the given software alert data object satisfies the condition, the given software alert data object is assigned a respective entity-based alert priority designation and the entity-based alert priority score adjustment score for the respective entity-based alert priority designation.

The term "real-time importance indicator" refers to a data construct that is generated by a model execution engine of a software monitoring data management computing device and stored as part of a storage subsystem of a software monitoring data management system. A real-time importance indicator describes whether a corresponding alert attribute data field of a software alert data objects is currently experiencing a maintenance-critical period as described by one or more real-time operational features of a current operational state of the software application framework. For example, the real-time importance indicator for a team identifier of a software alert data object may describe whether the corresponding team is currently in a critical condition. As another example, the real-time importance indicator for an alert attribute data field that describes module/component/subsystem identifiers of a given software alert data object may describe whether at least one of the affected modules/components/subsystems is currently in a critical condition.

The term "temporal alert priority designation" refers to a data construct that is generated by a model execution engine of a software monitoring data management computing device and stored as part of a storage subsystem of a software monitoring data management system. The temporal alert priority designation describes how many of and/or what ratio of the real-time importance indicators for the alert attribute data fields of the software alert data object are affirmative real-time importance indicators (i.e., describe that the corresponding alert attribute data fields currently are associated with maintenance-critical conditions). In some embodiments, the temporal alert priority designation for a software alert data object describes whether at least one of the real-time importance indicators for the alert attribute data fields of the software alert data object are affirmative real-time importance indicators. In some embodiments, the temporal alert priority designation for a software alert data object describes a statistical distribution measure (e.g., an average measure of) the real-time importance indicators for the alert attribute data fields of the software alert data object. For example, a temporal alert priority score adjustment model may be associated with a condition that is satisfied when a team identifier of a given software alert data object is associated with a real-time importance indicator that describes that the particular team is currently in a critical condition, where, if the given software alert data object satisfies the condition, the given software alert data object is assigned a respective temporal alert priority designation. As another example, a temporal alert priority score adjustment model may be associated with a condition that is satisfied when at least one of module/component/subsystem identifiers of a given software alert data object (that describes which modules/components/subsystems of a corresponding software application framework are affected by the given software alert data object) is associated with a real-time importance indicator that describes that the particular affected module/component/subsystem is currently in a critical condition, where, if the given software alert data object satisfies the condition, the given software alert data object is assigned a respective temporal alert priority designation.

The term "temporal alert priority score adjustment score" refers to a data construct that is generated by a model execution engine of a software monitoring data management computing device and stored as part of a storage subsystem of a software monitoring data management system. The temporal alert priority score adjustment score describes an alert priority score that is assigned to the software alert data object based on the temporal alert priority designation for the software alert data object. For example, a temporal alert priority score adjustment model may be associated with a condition that is satisfied when a team identifier of a given software alert data object is associated with a real-time importance indicator that describes that the particular team is currently in a critical condition, where, if the given software alert data object satisfies the condition, the given software alert data object is assigned a respective temporal alert priority designation and the temporal alert priority score adjustment score for the respective temporal alert priority designation. As another example, a temporal alert priority score adjustment model may be associated with a condition that is satisfied when at least one of module/component/subsystem identifiers of a given software alert data object (that describes which modules/components/subsystems of a corresponding software application framework are affected by the given software alert data object) is associated with a real-time importance indicator that describes that the particular affected module/component/subsystem is currently in a critical condition, where, if the given software alert data object satisfies the condition, the given software alert data object is assigned a respective temporal alert priority designation and the temporal alert priority score adjustment score for the respective temporal alert priority designation.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
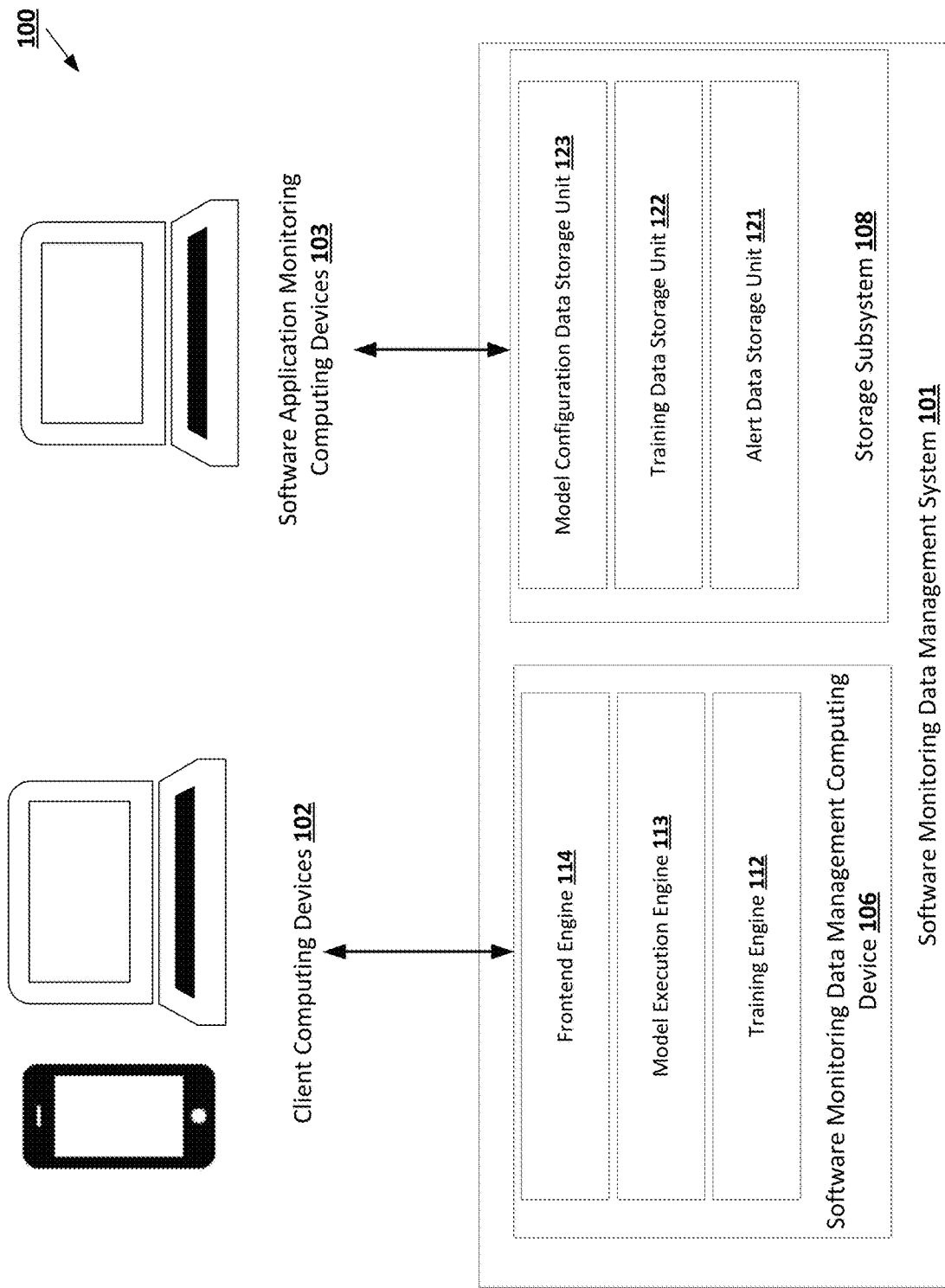
FIG. 1 is a block diagram of an example architecture within which at least some embodiments of the present invention may operate.

FIG. 1 depicts an exemplary architecture 100 for performing predictive monitoring of a software application framework that is associated with one or more software application monitoring computing devices 103. The architecture 100 includes one or more client computing devices 102, a software monitoring data management system 101, and the one or more software application monitoring computing devices 103.

The one or more software application monitoring computing devices 103 are configured to transmit software alert data objects to the software monitoring data management system 101, which the software monitoring data management system 101 may store in the alert data storage unit 121 in the storage subsystem 108 of the software monitoring data management system 101. The software monitoring data management computing device 106 may generate, using the training engine 112, one or more machine learning models based on training data stored in a training data storage unit 122. The software monitoring data management computing device 106 may further process, using a model execution engine 113, the software alert data objects that are stored in the alert data storage unit 121 using the model configuration data that are stored in the model configuration data storage unit 123 in the storage subsystem 108 of the software monitoring data management system 101 in order to generate prediction outputs that are transmitted to the client computing devices 102 via a frontend engine 114 of the software monitoring data management computing device 106.

The client computing devices 102, the software application monitoring computing devices 103, and the software monitoring data management computing device 106 may communicate over one or more networks. A network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, a network may include a cellular telephone, an 802.11, 802.16, 802.20, and/or WiMax network. Further, a network may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the page management system. In some embodiments, the protocol is a custom protocol of JavaScript Object Notation (JSON) objects sent via a Websocket channel. In some embodiments, the protocol is JSON over RPC, JSON over REST/HTTP, and the like.

Exemplary Software Monitoring Data Management Computing Device

Figure 2:
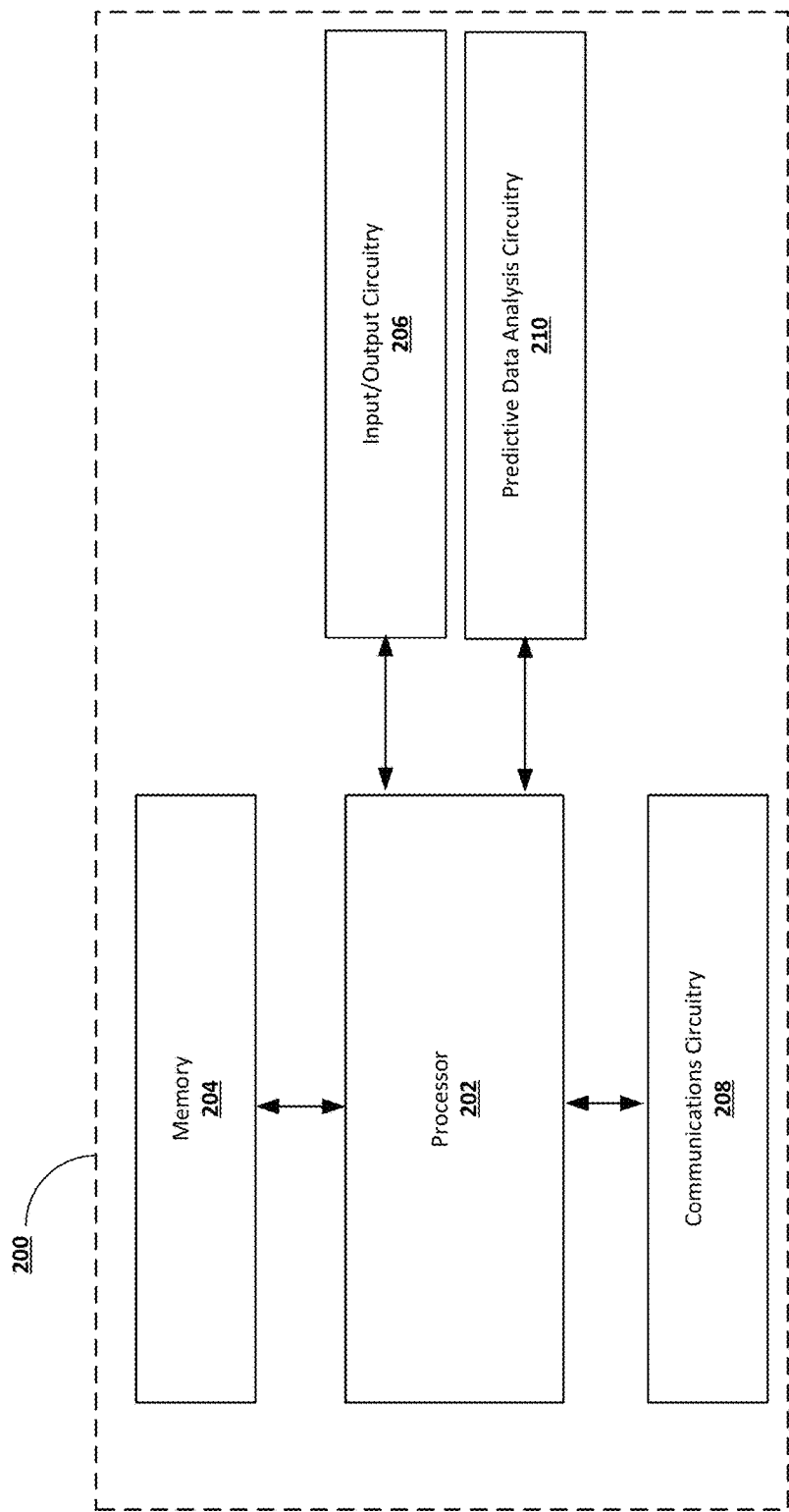
FIG. 2 is a block diagram of an example software monitoring data management computing device in accordance with at least some embodiments of the present invention.

The software monitoring data management computing device 106 may be embodied by one or more computing systems, such as apparatus 200 shown in FIG. 2. The apparatus 200 may include processor 202, memory 204, input/output circuitry 206, communications circuitry 208, and a predictive data analysis circuitry 210. The apparatus 200 may be configured to execute the operations described herein. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The predictive data analysis circuitry 210 may be any means such as a device or circuitry embodied in either hardware or a combination of hardware and software that is configured to perform predictive data analysis operations. For example, the predictive data analysis circuitry 210 may include specialized circuitry that is configured to perform machine learning operations in an expediated manner, such as graphical processing unit (GPU) circuitry and/or tensor processing unit (TPU) circuitry.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Computing Device

Figure 3:
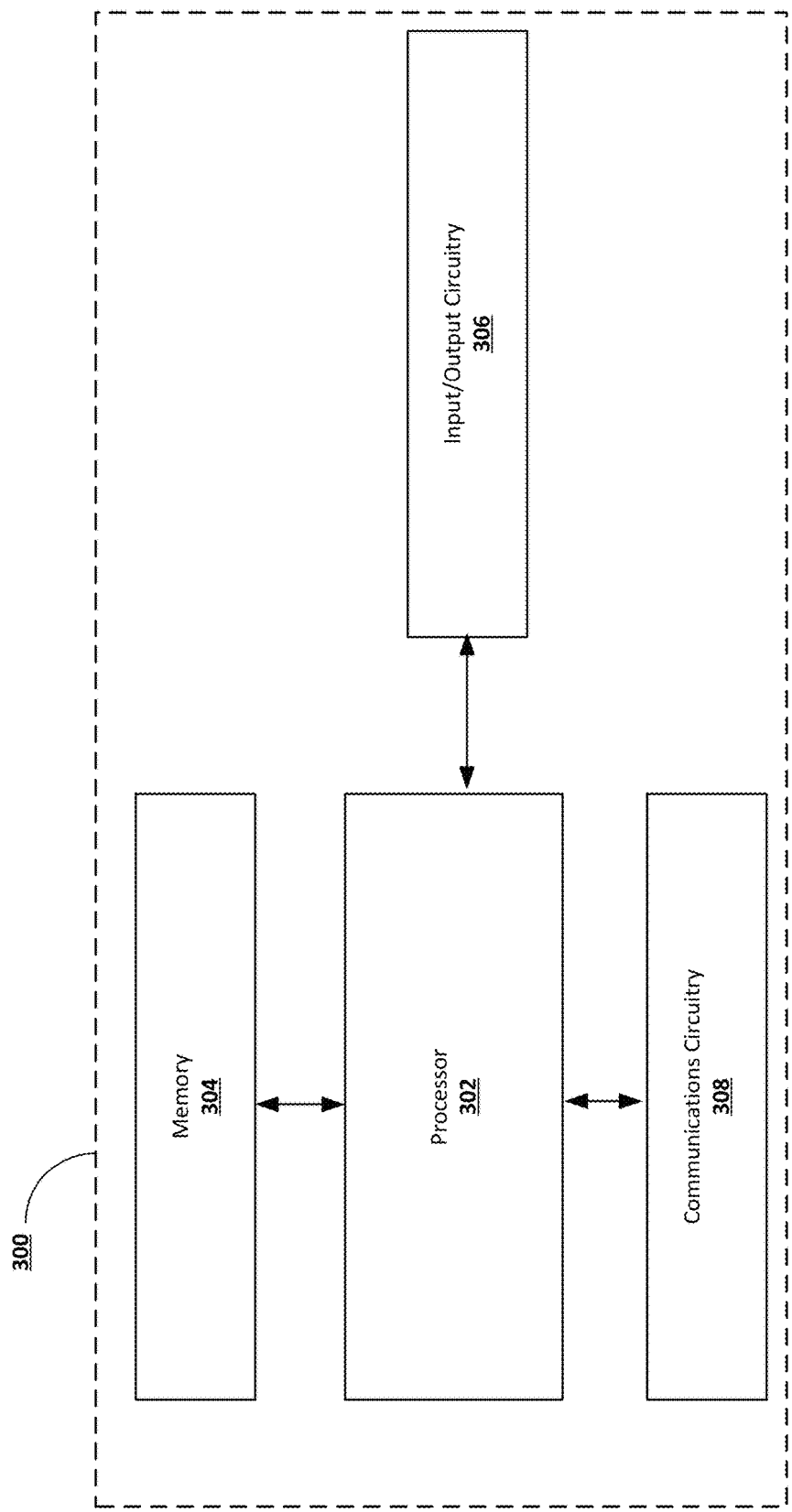
FIG. 3 is a block diagram of an example client computing device in accordance with at least some embodiments of the present invention.

Referring now to FIG. 3, a client computing device may be embodied by one or more computing systems, such as apparatus 300 shown in FIG. 3. The apparatus 300 may include processor 302, memory 304, input/output circuitry 306, and a communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 306 may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means, such as a device or circuitry embodied in either hardware or a combination of hardware and software, that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Exemplary Software Application Monitoring Computing Device

Figure 4:
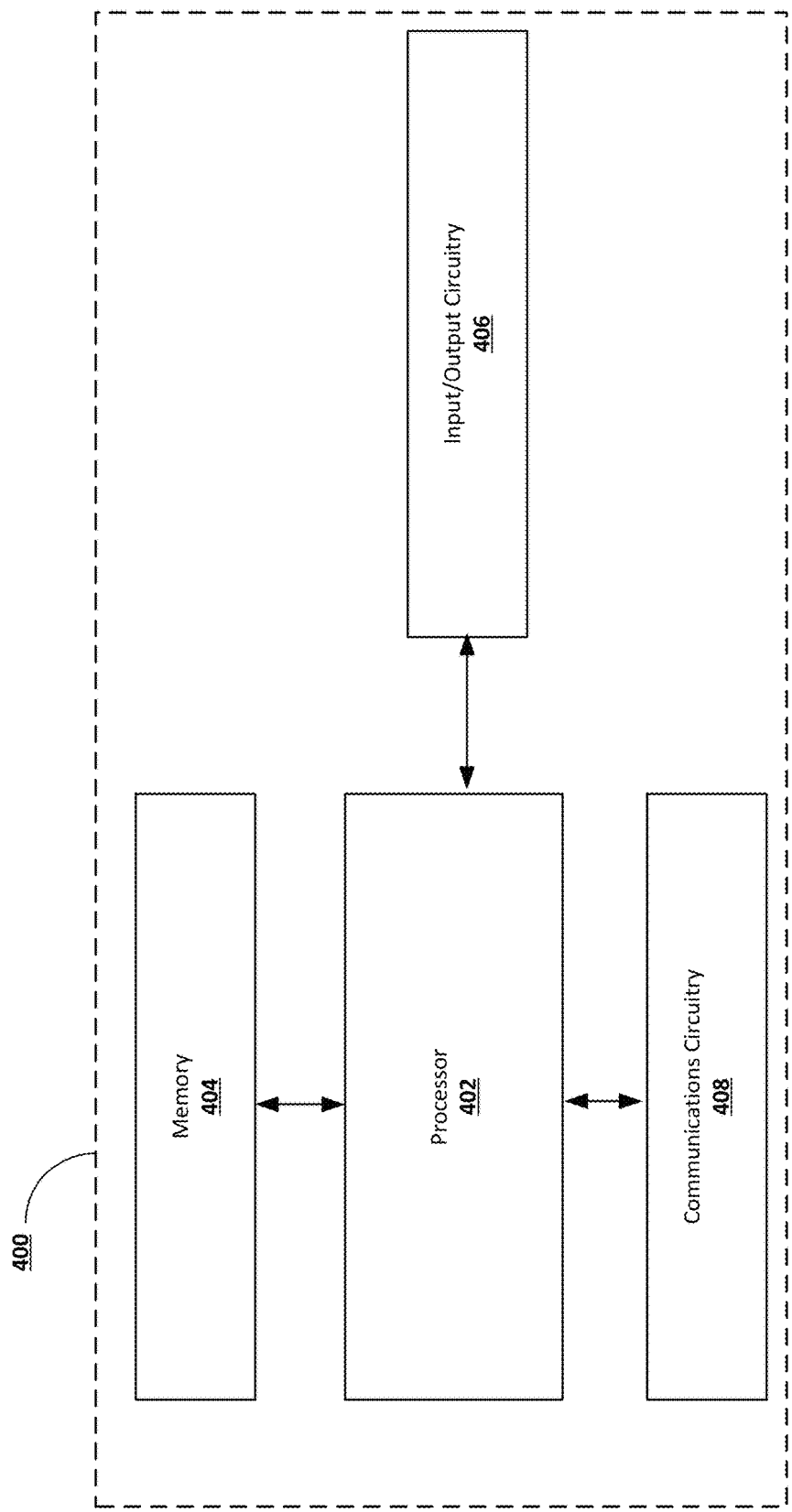
FIG. 4 is a block diagram of an example software application monitoring computing device in accordance with at least some embodiments of the present invention.

Referring now to FIG. 4, a software application monitoring computing device may be embodied by one or more computing systems, such as apparatus 400 shown in FIG. 4. The apparatus 400 may include processor 402, memory 404, input/output circuitry 406, and communications circuitry 408. Although these components 402-408 are described with respect to functional limitations, it should be understood that the particular implementations necessarily include the use of particular hardware. It should also be understood that certain of these components 402-408 may include similar or common hardware. For example, two sets of circuitries may both leverage use of the same processor, network interface, storage medium, or the like to perform their associated functions, such that duplicate hardware is not required for each set of circuitries.

In some embodiments, the processor 402 (and/or co-processor or any other processing circuitry assisting or otherwise associated with the processor) may be in communication with the memory 404 via a bus for passing information among components of the apparatus. The memory 404 is non-transitory and may include, for example, one or more volatile and/or non-volatile memories. In other words, for example, the memory 404 may be an electronic storage device (e.g., a computer-readable storage medium). The memory 404 may include one or more databases. Furthermore, the memory 404 may be configured to store information, data, content, applications, instructions, or the like for enabling the apparatus 400 to carry out various functions in accordance with example embodiments of the present invention.

The processor 402 may be embodied in a number of different ways and may, for example, include one or more processing devices configured to perform independently. In some preferred and non-limiting embodiments, the processor 402 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 402 may be configured to execute instructions stored in the memory 404 or otherwise accessible to the processor 402. In some preferred and non-limiting embodiments, the processor 402 may be configured to execute hard-coded functionalities. As such, whether configured by hardware or software methods, or by a combination thereof, the processor 402 may represent an entity (e.g., physically embodied in circuitry) capable of performing operations according to an embodiment of the present invention while configured accordingly. Alternatively, as another example, when the processor 402 is embodied as an executor of software instructions (e.g., computer program instructions), the instructions may specifically configure the processor 402 to perform the algorithms and/or operations described herein when the instructions are executed.

In some embodiments, the apparatus 400 may include input/output circuitry 406 that may, in turn, be in communication with processor 402 to provide output to the user and, in some embodiments, to receive an indication of a user input. The input/output circuitry 406 may comprise a user interface and may include a display, and may comprise a web user interface, a mobile application, a query-initiating computing device, a kiosk, or the like.

In embodiments in which the apparatus 400 is embodied by a limited interaction device, the input/output circuitry 406 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 406 may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 404, and/or the like).

The communications circuitry 408 may be any means, such as a device or circuitry embodied in either hardware or a combination of hardware and software, that is configured to receive and/or transmit data from/to a network and/or any other device, circuitry, or module in communication with the apparatus 400. In this regard, the communications circuitry 408 may include, for example, a network interface for enabling communications with a wired or wireless communication network. For example, the communications circuitry 408 may include one or more network interface cards, antennae, buses, switches, routers, modems, and supporting hardware and/or software, or any other device suitable for enabling communications via a network. Additionally or alternatively, the communications circuitry 408 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 400. In some embodiments, one or more external systems (such as a remote cloud computing and/or data storage system) may also be leveraged to provide at least some of the functionality discussed herein.

Example Data Flows and Operations

To address technical challenges related to monitoring complex software application frameworks, various embodiments of the present invention describe techniques for generating alert signatures for software alert data objects of a complex software application framework that are determined using at least one of: (i) a conditional ensemble machine learning framework comprise one or more alert priority score generation machine learning models, one or more alert priority explanation generation machine learning models, and a conditional ensemble machine learning model that is configured to generate an explanation-inclusive alert signature if a deep-learning-based alert priority score generated by the alert priority score generation machine learning models is identical to a decision-tree-based alert priority designation generated by the alert priority explanation generation machine learning models, and (ii) a set of alert priority score adjustment models such as an entity-based alert priority score adjustment model, a temporal alert priority score adjustment model, and a similarity-based alert priority score adjustment model.

FIG. 4 is a flowchart diagram of an example process 500 for generating an alert signature 521 for a software alert data object 501. Via the various steps/operations of the process 500, the software monitoring data management computing device 106 is configured to use at least one of a conditional ensemble machine learning framework 511 and a set of alert priority score adjustment models 512 to generate the alert signature 521 for the software alert data object 501.

The process 500 begins when the conditional ensemble machine learning framework 511 receives the software alert data object 501 and processes the software alert data object 501 to generate an initial alert signature 531. In some embodiments, the conditional ensemble machine learning framework 511 comprises: (i) one or more alert priority score generation machine learning models such as an alert classification neural network machine learning model, (ii) one or more alert priority explanation generation machine learning models such as an alert classification decision tree machine learning model, and (iii) a conditional ensemble machine learning model. In some embodiments, the conditional ensemble machine learning model is configured to generate the initial alert signature 531 based on at least one of the alert priority scores generated by the alert priority score generation machine learning models and the alert priority explanations generated by the alert priority explanation generation machine learning models.

In some embodiments, the software alert data object describes one or more properties associated with execution, maintenance, configuration management and/or external integration of a software application framework being monitored by the software application monitoring computing device. For example, the software alert data object may describe one or more execution properties associated with execution and/or operation of a software application framework being monitored by the software application monitoring computing device during a maintenance-critical state (e.g., a software failure state) of the software application framework. In some embodiments, a software alert data object describes an alert, which may be generated when a software application monitoring computing device detects a maintenance-critical state of a software application framework. In some embodiments, a software alert data object describes an incident, which may be an unplanned interruption to a service or reduction in the quality of a service or a failure of a software application framework. In some embodiments, a software alert data object is generated based on data (e.g., communication data) transmitted from an external system that is integrated with the software application framework, such as from the Amazon Simple Email Service (SES) system, the Amazon Simple Notification Service (Amazon SNS) system, a videoconferencing software application, and/or the like.

In some embodiments, the software alert data objects describes a set of alert attribute data fields associated with the corresponding mission-critical state. Examples of alert attribute data fields of a software alert data object include one or more numerical attribute data fields, such as a numerical attribute data field describing the deduplication count of the software alert data object, a numerical attribute data field describing the number of other software alert data objects created during a 15-minute window around the creation time of the software alert data object, a numerical attribute data field describing the number of nth priority level software alert data objects created during a 15-minute window around the creation time of the software alert data object (where n may iterate over the range of software alert data object priority levels), an average inter-arrival time of software alert data objects at the creation time of the software alert data object, and/or the like. Other examples of alert attribute data fields of a software alert data object include one or more categorical attribute data fields, such as a categorical attribute data field describing the priority level of the software alert data object (e.g., describing whether the software alert data object is P1, P2, P3, P4, or P5), a categorical attribute data field describing the alert source of the software alert data object (e.g., describing whether the software alert data object is user-initiated, system-initiated, request-initiated, and/or the like), a categorical attribute data field describing whether the creation time of the software alert data object is a weekend or a weekday, and/or the like. Other examples of alert attribute data fields for a software alert data object include an embedded representation of a natural language format field (e.g., an alert message field) of the software alert data object, such as an embedded representation generated based on the output of processing the alert message field of the software alert data object using a text encoder machine learning model such as the Google's Universal Sentence Encoder.

In some embodiments, the conditional ensemble machine learning framework 511 has the architecture that is depicted in FIG. 6. As depicted in FIG. 6, the conditional ensemble machine learning framework 511 comprises one or more alert priority score generation machine learning models 601 including an alert classification neural network machine learning model 631, where the one or more alert priority score generation machine learning models 601 are collectively configured to generate a deep-learning-based alert priority score 611 for the software alert data object 401. An alert priority score generation machine learning model may be any machine learning model that is configured to generate an alert priority score for a software alert data object. Accordingly, while various embodiments of the present invention describe that an alert classification neural network machine learning model that is configured to generate a deep-learning-based alert priority score for an input software alert data object is the sole alert priority score generation machine learning model, a person of ordinary skill in the relevant technology will recognize that a conditional ensemble machine learning framework may include any number of alert priority score generation machine learning models. In some embodiments, if the conditional ensemble machine learning framework comprises two or more alert priority score generation machine learning models, then a deep-learning-based alert priority score for the software alert data object may be generated by combining (e.g., averaging, computing a weighted average of, and/or the like) of the two or more alert priority scores generated by the two or more alert priority score generation machine learning models. In some embodiments, once generated, the deep-learning-based alert priority score for the software alert data object 401 as generated by the two or more alert priority score generation machine learning models 601 can be used (e.g., can be discretized using thresholding) to generate a deep-learning-based alert priority designation for the software alert data object.

As described above, an example of an alert priority score generation machine learning model is an alert classification neural network machine learning model. The alert classification neural network machine learning model may be configured to alert attribute data fields of a software alert data object in accordance with the trained parameters of the alert classification neural network machine learning model to generate an alert priority score that can be used to generate a deep-learning-based alert priority designation for the software alert data object. In some embodiments, the alert classification neural network machine learning model comprises a set of neural network layers that are collectively configured to process the output data by processing alert attribute data fields associated with a software alert data object. In some embodiments, the set of neural network layers are configured to generate a deep-learning-based alert priority score for the software alert data object based on the alert attribute data fields associated with the software alert data object, and the deep-learning-based alert priority designation for the software alert data object based on whether the deep-learning-based alert priority score for the software alert data object satisfies (e.g., exceeds) a deep-learning-based alert priority score threshold. For example, in some embodiments, if the deep-learning-based alert priority score for the software alert data object satisfies a deep-learning-based alert priority score threshold, the software alert data object is assigned an affirmative deep-learning-based alert priority designation, while if the deep-learning-based alert priority score for the software alert data object fails to satisfy a deep-learning-based alert priority score threshold, the software alert data object is assigned a negative deep-learning-based alert priority designation.

Other examples of alert priority score generation machine learning models include clustering-based alert priority score generation machine learning models, temporal-sequential alert classification machine learning models, categorical-sequential alert classification machine learning models, attention-based alert clustering machine learning models, and/or the like. For example, in some embodiments, the clustering-based alert priority score generation machine learning model generates a deep-learning-based alert priority score for a software alert score based on a generated alert cluster for the software alert data object. Examples of alert clustering machine learning models include alert clustering machine learning models that include at least one of a k-means clustering algorithm, a density-based spatial clustering of applications (DBSCAN) clustering algorithm, an agglomerative clustering algorithm, an affinity propagation clustering algorithm, and/or the like. In some embodiments, once generated, the following features are generated for an alert cluster: (i) an alert count for the alert cluster, (ii) a priority distribution for the alert cluster, or (iii) an inter-alert arrival time distribution for the alert cluster. In some embodiments, an alert feature set for a software alert data object describes at least one of an alert attribute data field of the software alert data object and/or an embedded representation of a natural language format field (e.g., an alert message field) of the software alert data object, such as an embedded representation generated based on the output of processing the alert message field of the software alert data object using a text encoder machine learning model such as the Google's Universal Sentence Encoder. In some embodiments, the alert cluster for a software alert data object describes a set of software alert data objects that are determined to be related to the software alert data object. In some embodiments, each alert cluster is associated with an alert count that describes a number of software alert data objects that are in the alert cluster. In some embodiments, each alert cluster is associated with a priority distribution that describes, for each priority level of a set of priority levels, a ratio of the software alert data objects in the alert cluster that are associated with the noted priority level. In some embodiments, each cluster is associated with an inter-alert arrival time distribution that describes a distribution of time delays between consecutive software alert data objects in a sequence of software alert data objects in the alert cluster that is determined based on creation times of the software alert data objects in the alert cluster. In some embodiments, once detected, the alert cluster of a software alert data object is used to generate clustering metadata for the software alert data object that may be used to perform incident management operations with respect to the software alert data object.

In some embodiments, a temporal-sequential alert classification machine learning model is configured to process the alert representations for all of the temporal neighbor software alert data objects of a particular software alert data object (i.e., all of the temporal neighbor alert representations for the temporal neighbor software alert data objects of the particular software alert data object) to generate a temporal-sequential alert classification score for the particular software alert data object. Accordingly, the temporal-sequential alert classification machine learning model is configured to process alert representations for a stream of software alert data objects that are within the defined temporal window of a primary software alert data object in the stream to generate a likelihood that the stream relates to at least one software incident data object. In some embodiments, the temporal-sequential alert classification machine learning model is trained using a set of training data entries. In some embodiments, a training data entry describes feature data associated with a stream of software alert data objects and a ground-truth stream classification label that describes whether the stream is related to at least one software incident data object. In some embodiments, the ground-truth stream classification label for a stream of software alert data objects is an affirmative ground-truth stream classification score if the stream comprises all of the software alert data objects that occur within the defined temporal window of a software incident data object. In some embodiments, the ground-truth stream classification label for a stream of software alert data objects is a negative ground-truth stream classification score if the stream comprises a set of software alert data objects that are randomly sampled without associations with any defined temporal windows of any software incident data objects. In some embodiments, the temporal-sequential alert classification machine learning model comprises: (i) a set of one-dimensional convolutional layers that are configured to generate a convolutional representation of a stream of alert representations, (ii) a one-dimensional max-pooling layer that is configured to process the convolutional representation to generate a max-pooled representation that is generated by introducing shift invariance and scale invariance with respect to the convolutional representation, (iv) a flattening layer that is configured to process the max-pooled representation to generate a flattened representation, and (v) a set of dense neural network layers that are configured to process the flattened representation to generate the temporal-sequential alert classification score.

In some embodiments, a categorical-sequential alert classification machine learning model is configured to process alert representations of categorical neighbor software alert data objects of a particular software alert data object (i.e., categorical neighbor alert representations for the categorical neighbor software alert data objects of the particular software alert data object) to generate a categorical-sequential alert classification score for the particular software alert data object. In some embodiments, the categorical-sequential alert classification machine learning model is configured to process alert representations for a stream of software alert data objects that are within the defined temporal window of a primary software alert data object in the stream and are associated with a target grouping category (e.g., a target team identifier) of the primary software alert data object to generate a likelihood that the stream relates to at least one software incident data object. In some embodiments, the categorical-sequential alert classification machine learning model is trained using a set of training data entries. In some embodiments, a training data entry describes feature data associated with a stream of software alert data objects and a ground-truth stream classification label that describes whether the stream is related to at least one software incident data object. In some embodiments, the ground-truth stream classification label for a stream of software alert data objects is an affirmative ground-truth stream classification score if the stream comprises all of the software alert data objects that occur within the defined temporal window of a software incident data object and are associated with a team identifier for the software incident data object. In some embodiments, the ground-truth stream classification label for a stream of software alert data objects is a negative ground-truth stream classification score if the stream comprises a set of software alert data objects that are randomly sampled without associations with any defined temporal windows of any software incident data objects and/or without associations with team identifiers of any software incident data objects. In some embodiments, the categorical-sequential alert classification machine learning model comprises: (i) a set of one-dimensional convolutional layers that are configured to generate a convolutional representation of a stream of alert representations, (ii) a one-dimensional max-pooling layer that is configured to process the convolutional representation to generate a max-pooled representation that is generated by introducing shift invariance and scale invariance with respect to the convolutional representation, (iv) a flattening layer that is configured to process the max-pooled representation to generate a flattened representation, and (v) a set of dense neural network layers that are configured to process the flattened representation to generate the categorical-sequential alert classification score.

In some embodiments, an attention-based alert clustering machine learning model comprises an attention-based encoder machine learning model and an encoder-based alert classification machine learning model, where the attention-based encoder machine learning model is configured to generate an attention-based alert encoding for the software alert data object based on attention neighbor attention-based feature sets for attention neighbor software alert data objects that are in an encoder attention window for the software alert data object, and the encoder-based alert classification machine learning model is configured to generate the attention-based alert classification score based on the attention-based alert encoding. The encoder attention window for a software alert data object describes the combination of: (i) the software alert data object, and (ii) X software alert data objects that occur before the software alert data object and Y software alert data objects that occur after the software alert data object in a defined sequence of software alert data objects for a monitored software application framework (e.g., a sequence defined based on a temporal order of creation times of the software alert data objects of the monitored software alert data object). The software alert data objects that are within the encoder attention window of a particular software alert data object are referred to herein as the "attention neighbor software alert data objects" of the particular software alert data object. In some embodiments, attention-based feature sets for attention neighbor software alert data objects of a particular software alert data object (i.e., attention neighbor alert attention-based feature sets for the attention neighbor software alert data objects of the particular software alert data object) are processed by an attention-based alert classification machine learning framework to generate an attention-based alert classification for the particular software alert data object. The attention-based alert clustering machine learning model is configured to process attention neighbor attention-based feature sets for attention neighbor software alert data objects of a particular software alert data object to generate an attention-based alert classification score for the particular software alert data object. In some embodiments, the attention-based alert classification machine learning framework comprises: (i) an attention-based encoder machine learning model that is configured to process the attention neighbor attention-based feature sets for the attention neighbor software alert data objects of the particular software alert data object to generate an attention-based alert encoding for the software alert data object, and (ii) an encoder-based alert classification machine learning model that is configured to process the attention-based alert encoding to generate the attention-based alert classification score for the particular software alert data object.

As described above, the alert priority score generation machine learning models 601 generate a deep-learning-based alert priority score that describes a computed/predicted likelihood that a corresponding software alert data object is related to at least one software incident data object as generated by the alert classification neural network machine learning model. In some embodiments, the deep-learning-based alert priority score is generated by the alert classification neural network machine learning model based on processing the alert attribute data fields associated with the corresponding software alert data object. In some embodiments, the deep-learning-based alert priority score for a software alert data object is used to generate a deep-learning-based alert priority designation for the software alert data object. In some embodiments, because the deep-learning-based alert priority score is generated by a set of neural network layers characterized by a set of trained neural network parameters, the deep-learning-based alert priority score is an uninterpretable prediction about the computed/predicted likelihood that a corresponding software alert data object is related to at least one software incident data object because the structure of the neural network architecture fails to provide predictive insights about why a particular deep-learning-based alert priority score is generated for a particular software incident data object. In some of the noted embodiments, because of this limitation of the deep-learning-based alert priority scores generated by an alert classification neural network machine learning model, a conditional ensemble machine learning model is configured to generate whether the particular deep-learning-based alert priority score can be mapped to a decision-tree-based alert priority designation and may, in response to determining that the particular deep-learning-based alert priority score can be mapped to a decision-tree-based alert priority designation, generate explanatory metadata for the deep-learning-based alert priority score based on the decision-tree-based alert priority designation (e.g., based on a tree traversal sequence associated with generating the decision-tree-based alert priority designation).

Returning to FIG. 6, the conditional ensemble machine learning framework 511 comprises one or more alert priority explanation generation machine learning models 602, including an alert classification decision tree machine learning model 632, where the one or more alert priority explanation generation machine learning models 602 are collectively configured to generate explanatory metadata 612 for the software alert data object 401. An alert priority explanatory generation machine learning model may be any machine learning model that is configured to generate explanatory metadata for an alert priority score and/or an alert priority designation for a software alert data object. Accordingly, while various embodiments of the present invention describe that an alert classification decision tree machine learning model that is configured to generate a decision-tree-based alert priority designation for an input software alert data object is the sole alert priority explanation generation machine learning model, a person of ordinary skill in the relevant technology will recognize that a conditional ensemble machine learning framework may include any number of alert priority explanation generation machine learning models. In some embodiments, if the conditional ensemble machine learning framework comprises two or more alert priority explanation generation machine learning models, then explanatory metadata for the software alert data object may be generated by combining (e.g., concatenating) the two or more explanatory metadata generated by the two or more alert priority explanation generation machine learning models.

As described above, an example of an alert priority explanation generation machine learning model is an alert classification decision tree machine learning model. In some embodiments, an alert priority explanation generation machine learning model processes alert attribute data fields of a software alert data object in accordance with a generated decision tree structure of the alert classification decision tree machine learning model to generate a decision-tree-based alert priority designation for the software alert data object. Accordingly, the alert classification decision tree machine learning model comprises a decision tree structure having a set of defined hierarchical relationships associated with a set of decision tree nodes, where each decision tree node may correspond to a condition that is defined based on a set of alert attribute data fields that are associated with the condition. For example, a root decision tree node may specify a condition requiring that the team identifier of a given software alert data object belong to a defined set of team identifiers. In some embodiments, given the noted root decision tree node, if a given software alert data object satisfies the noted condition (i.e., if the team identifier of the given software alert data object is in the defined set), processing of the given software alert data object using the alert classification decision tree machine learning model comprises processing the given software alert data object using an associated branch (e.g., a left branch) of the decision tree structure and using a root decision tree node of the associated branch, while if the given software alert data object fails to satisfy the noted condition (i.e., if the team identifier of the given software alert data object is not in the defined set), processing of the given software alert data object using the alert classification decision tree machine learning model comprises processing the given software alert data object using an associated branch (e.g., a right branch) of the decision tree structure and using a root decision tree node of the associated branch.

In some embodiments, while generating output data for a software alert data object, the alert classification decision tree machine learning model generates a tree traversal sequence for the software alert data object. In some embodiments, the tree traversal sequence describes the set of decision tree nodes and/or the set of decision tree links/edges of a decision tree structure of an alert classification decision tree machine learning model that are visited/traversed by the alert classification decision tree machine learning model when processing a corresponding software alert data object. For example, if the decision tree structure of an alert classification decision tree machine learning model comprises a root decision tree nodes that tests for a first condition that is satisfied when the team identifier of a given software alert data object falls within a set of qualifying team identifiers, and if upon satisfaction of the first condition the given software alert data object is processed using a left decision tree branch whose root decision tree node tests for a second condition that is satisfied when the timestamp of a given software alert data object falls within a qualifying time range, then assuming that the team identifier for a particular software alert data object falls within the set of qualifying team identifiers and that the timestamp of the particular software alert data object falls within the qualifying time range, then the tree traversal sequence for the particular software alert data object may describe at least one of the following: (i) the root decision tree node, (ii) the leftward link/edge of the root decision tree node, or (iii) the root decision tree node of the right decision tree branch. As described below, the tree traversal sequence that is associated with processing a software alert data object using the decision tree structure of an alert classification decision tree machine learning model may be used to generate explanatory metadata associated with the noted software alert data object.

In some embodiments, the alert classification decision tree machine learning model generates explanatory metadata for a software alert data object based on the tree traversal sequence associated with the software alert data object. In some embodiments, the explanatory metadata refers to an automatically-generated explanation for why a decision-tree-based alert priority designation for a software alert data object is generated, where the automatically-generated explanation is generated based on the tree traversal sequence for the software alert data object as generated by an alert classification decision tree machine learning model via processing alert attribute features associated with the software alert data object in accordance with the decision tree structure of the alert classification decision tree machine learning model. For example, as described above, if the decision tree structure of an alert classification decision tree machine learning model comprises a root decision tree nodes that tests for a first condition that is satisfied when the team identifier of a given software alert data object falls within a set of qualifying team identifiers, and if upon satisfaction of the first condition the given software alert data object is processed using a left decision tree branch whose root decision tree node tests for a second condition that is satisfied when the timestamp of a given software alert data object falls within a qualifying time range, then assuming that the team identifier for a particular software alert data object falls within the set of qualifying team identifiers and that the timestamp of the particular software alert data object falls within the qualifying time range, then the tree traversal sequence for the particular software alert data object may describe at least one of the following: (i) the root decision tree node, (ii) the leftward link/edge of the root decision tree node, or (iii) the root decision tree node of the right decision tree branch. In this example, if the decision-tree-based alert priority designation for the software alert data object as generated in accordance with the value assigned to a leaf decision tree node of the tree traversal sequence is an affirmative decision-tree-based alert priority designation, the explanatory metadata for the software alert data object may describe, in structured format, that the software alert data object is assigned an affirmative decision-tree-based alert priority designation in part because the team identifier of the software alert data object falls within the set of qualifying team identifiers and the timestamp of the software alert data object falls within the qualifying time range. In some embodiments, the explanatory metadata may be used by a conditional ensemble machine learning model to generate an alert signature for the software alert data object if the deep-learning-based alert priority designation for the software alert data object and the decision-tree-based alert priority designation for the software alert data object both describe an identical alert priority designation.

Returning to FIG. 6, the conditional ensemble machine learning framework 511 comprises a conditional ensemble machine learning model 603 that is configured to combine the deep-learning-based alert priority score 611 generated by the one or more alert priority score generation machine learning models 601 and the explanatory metadata 612 generated by the one or more alert priority explanation generation machine learning models 602 to generate the initial alert signature 531. In some embodiments, the conditional ensemble machine learning framework 511: (i) maps the deep-learning-based alert priority score 611 generated by the one or more alert priority score generation machine learning models 601 to a deep-learning-based alert priority designation, (ii) determines whether the deep-learning-based alert priority designation is identical to a decision-tree-based alert priority designation generated by alert classification decision tree machine learning model 632, (iii) if the two alert priority designations are identical, generates the initial alert signature 531 to comprise the deep-learning-based alert priority score 611 and the explanatory metadata generated by the one or more alert priority explanation generation machine learning models 602, and (iv) if the two alert priority designations are different, generates the initial alert signature 531 to comprise the deep-learning-based alert priority score 611 but not the explanatory metadata generated by the one or more alert priority explanation generation machine learning models 602.

In some embodiments, the conditional ensemble machine learning model 603 is configured to generate the initial alert signature for a software alert data object based on whether the deep-learning-based alert priority designation for the software alert data object and the decision-tree-based alert priority designation for the software alert data object are identical. In some of the noted embodiments, if the conditional ensemble machine learning model determines that the deep-learning-based alert priority designation for the software alert data object and the decision-tree-based alert priority designation for the software alert data object are identical, the conditional ensemble machine learning model may generate the initial alert signature for the software alert data object to describe both data associated with the deep-learning-based alert priority designation (e.g., the deep-learning-based alert priority score for the software alert data object that is used to generate the deep-learning-based alert priority designation) and explanatory metadata for the software alert data object that is generated based on the tree traversal sequence for the software alert data object.

In some embodiments, if the conditional ensemble machine learning model determines that the deep-learning-based alert priority designation for the software alert data object and the decision-tree-based alert priority designation for the software alert data object are different, the conditional ensemble machine learning model may generate the initial alert signature for the software alert data object to describe only data associated with the deep-learning-based alert priority designation (e.g., the deep-learning-based alert priority score for the software alert data object that is used to generate the deep-learning-based alert priority designation), but not the explanatory metadata for the software alert data object that is generated based on the tree traversal sequence for the software alert data object.

For example, in an exemplary embodiment in which a software alert data object is associated with a deep-learning-based alert priority score of 0.6 and an affirmative deep-learning-based alert priority designation, given a deep-learning-based alert priority score threshold of 0.5, the conditional ensemble machine learning model may: (i) determine that the software alert data object is associated with an affirmative deep-learning-based alert priority designation given that the deep-learning-based alert priority score of 0.6 satisfies (in this case, exceeds) the deep-learning-based alert priority threshold of 0.5, and (ii) because the deep-learning-based alert priority designation and the decision-tree-based alert priority designation both describe an affirmative alert priority designation, generate an initial alert signature for the software alert data object that describes the deep-learning-based alert priority score of 0.6, and explanatory metadata associated with the tree traversal sequence used to generate the affirmative decision-tree-based alert priority designation.

As another example, in an exemplary embodiment in which a software alert data object is associated with a deep-learning-based alert priority score of 0.4 and an affirmative deep-learning-based alert priority designation, given a deep-learning-based alert priority score threshold of 0.5, the conditional ensemble machine learning model may: (i) determine that the software alert data object is associated with a negative deep-learning-based alert priority designation given that the deep-learning-based alert priority score of 0.4 does not satisfy (in this case, does not exceed) the deep-learning-based alert priority threshold of 0.5, and (ii) because the deep-learning-based alert priority designation is a negative alert priority designation while the decision-tree-based alert priority designation is an affirmative alert priority designation (i.e., because the two alert priority designations are different), generate an initial alert signature for the software alert data object that describes the deep-learning-based alert priority score of 0.6 but not explanatory metadata associated with the tree traversal sequence used to generate the negative decision-tree-based alert priority designation.

In some embodiments, the conditional ensemble machine learning model 603 performs the operations of the process that is depicted in FIG. 7. The process that is depicted in FIG. 7 begins at operation 701 when the software monitoring data management computing device 106 identifies a deep-learning-based alert priority score for a software alert data object and a decision-tree-based alert priority designation for the software alert data object. In some embodiments, the decision-tree-based alert priority designation corresponds to a particular alert priority designation that is selected from a plurality of alert priority designations described by the alert priority designation schema. Examples of alert priority designation schemas include an alert priority designation schema that is characterized by a set of alert priority designations comprising an affirmative alert priority designation that is assigned to software alert data objects that are predicted to be likely to be related to a software incident data object and a negative alert priority designation that is assigned to software alert data objects that are predicted to be likely to be unrelated to a software incident data object; alert priority designation schema that is characterized by a set of alert priority designations comprising a high alert priority designation that is assigned to software alert data objects that are predicted to be highly likely to be related to a software incident data object, a medium alert priority designation that is assigned to software alert data objects that are predicted to be moderately likely to be related to a software incident data object, and a low alert priority designation that is assigned to software alert data objects that are predicted to be marginally likely to be related to a software incident data object; and/or the like. In general, an alert priority designation schema that may be characterized by N alert priority designations, where N may be two or more, and where the alert priority designation schema may be defined by developer-defined configuration data associated with the conditional ensemble machine learning model.

At operation 702, the software monitoring data management computing device 106 determines a deep-learning-based alert priority designation for the software alert data object based on the deep-learning-based alert priority score for the software alert data object. In some embodiments, the deep-learning-based alert priority designation describes a label that is assigned to a corresponding software alert data object that is determined based on a computed/predicted likelihood that the corresponding software alert data object is related to at least one software incident data object as generated by an alert classification neural network machine learning model. The deep-learning-based alert priority designation is generated based on output data (e.g., a deep-learning-based alert priority score) that is generated by the alert classification neural network machine learning model based on processing the alert attribute data fields associated with the corresponding software alert data object.

For example, in some embodiments, the alert classification neural network machine learning model is configured to generate a deep-learning-based alert priority score for the software alert data object based on the alert attribute data fields associated with the software alert data object, and the deep-learning-based alert priority designation for the software alert data object based on whether the deep-learning-based alert priority score for the software alert data object satisfies (e.g., exceeds) a deep-learning-based alert priority score threshold. For example, in some embodiments, if the deep-learning-based alert priority score for the software alert data object satisfies a deep-learning-based alert priority score threshold, the software alert data object is assigned an affirmative deep-learning-based alert priority designation, while if the deep-learning-based alert priority score for the software alert data object fails to satisfy a deep-learning-based alert priority score threshold, the software alert data object is assigned a negative deep-learning-based alert priority designation. As another example, in some embodiments, if the deep-learning-based alert priority score for the software alert data object falls within a first deep-learning-based alert priority score range, the software alert data object is assigned a high deep-learning-based alert priority designation; if the deep-learning-based alert priority score for the software alert data object falls within a second deep-learning-based alert priority score range, the software alert data object is assigned a medium deep-learning-based alert priority designation; and if the deep-learning-based alert priority score for the software alert data object falls within a third deep-learning-based alert priority score range, the software alert data object is assigned a high deep-learning-based alert priority designation.

In some embodiments, the particular deep-learning-based alert priority designation that is selected from a set of decision-tree-based alert priority designations defined by an alert priority designation schema that is the same as the alert priority designation schema from which the decision-tree-based alert priority designation is selected. As described above, examples of alert priority designation schemas include an alert priority designation schema that is characterized by a set of alert priority designations comprising an affirmative alert priority designation that is assigned to software alert data objects that are predicted to be likely to be related to a software incident data object and a negative alert priority designation that is assigned to software alert data objects that are predicted to be likely to be unrelated to a software incident data object; alert priority designation schema that is characterized by a set of alert priority designations comprising a high alert priority designation that is assigned to software alert data objects that are predicted to be highly likely to be related to a software incident data object, a medium alert priority designation that is assigned to software alert data objects that are predicted to be moderately likely to be related to a software incident data object, and a low alert priority designation that is assigned to software alert data objects that are predicted to be marginally likely to be related to a software incident data object; and/or the like.

At operation 703, the software monitoring data management computing device 106 generates the initial alert signature based on whether the deep-learning-based alert priority designation for the software alert data object and the decision-tree-based alert priority designation for the software alert data object are identical. In some embodiments, in response to determining that the first alert priority designation and the second alert priority designation are identical, the initial alert signature is generated based on the deep-learning-based alert priority score and alert priority score explanatory metadata that is generated based on the tree traversal sequence. In some embodiments, in response to determining that the first alert priority designation and the second alert priority designation are different, the initial alert signature is generated based on the deep-learning-based alert priority score.

In some embodiments, once generated by the conditional ensemble machine learning framework 511, the initial alert signature 531 is adopted as the final alert signature that is used to perform incident management operations for a respective software application framework. Accordingly, while various embodiments of the present invention describe adjusting the deep-learning-based alert priority score of an initial alert signature 531 using the alert priority score adjustment models 512, a person of ordinary skill in the relevant technology will recognize that the operations of the alert priority score adjustment models 512 may in some embodiments be skipped. Moreover, in some embodiments, the alert priority score adjustment models 512 may operate independent of the conditional ensemble machine learning framework 511 (e.g., may adjust alert priority scores generated by other machine learning frameworks, where the noted alert priority scores may or may not be associated with explanatory metadata).

Returning to FIG. 4, once the conditional ensemble machine learning framework 511 generates the initial alert signature 531, the alert priority score adjustment models 512 adjust the deep-learning-based alert priority score described by the initial alert signature 531 to generate the alert signature 521. In some embodiments, the alert signature 521 describes: (i) any explanatory metadata described by the initial alert signature 531, and (ii) the deep-learning-based alert priority score described by the initial alert signature 531.

In some embodiments, an alert priority score adjustment model is configured to: (i) determine whether alert attribute data fields for a software alert data object satisfy a condition of a set of conditions associated with the alert priority score adjustment model, where each condition is associated with an alert priority score adjustment score, and (ii) if the software alert data object satisfies a particular condition, then assign the alert priority score adjustment model for the particular condition to the software alert data object. For example, a particular alert priority score adjustment model may be configured to determine whether a current team status of a team identifier for the software alert data object indicates a critical team condition, and if so, assign a corresponding priority score adjustment score (e.g., a priority score adjustment score of 0.05) to the software alert data objects. In some embodiments, given M alert priority score adjustment models, a software alert data object may be assigned up to M alert priority score adjustment scores, where the assigned alert priority score adjustment scores may be combined (e.g., added) to an unadjusted alert priority score (e.g., a deep-learning-based alert priority score) for the software alert data object to generate an adjusted alert priority score for the software alert data object. In some embodiments, a particular alert priority score adjustment score that is assigned to a software alert data object by a particular alert priority score adjustment model may be a negative or a positive value. In some embodiments, when the particular alert priority score adjustment score is a positive non-zero value, then the particular alert priority score adjustment score may be deemed to be a "boosting" score and the particular alert priority score adjustment model may be deemed to be a "booster" predictive model. Examples of alert priority score adjustment models comprise an entity-based alert priority score adjustment model, a temporal alert priority score adjustment model, and a similarity-based alert priority score adjustment model.

In some embodiments, an entity-based alert priority score adjustment model may be configured to: (i) map a software alert data object to an entity-based alert priority designation based on one or more entity participation features for the software alert data object, and (ii) assign an alert priority adjustment score that is associated with the entity-based alert priority designation (referred to herein as an entity-based alert priority score adjustment score) to the software alert data object. In some embodiments, the entity-based alert priority score adjustment model defines one or more conditions, where each condition is satisfied when the entity participation features of a given software alert data object satisfy particular requirements, and where each condition is associated with an entity-based alert priority designation having a respective entity-based alert priority score adjustment score. For example, an entity-based alert priority score adjustment model may be associated with a condition that is satisfied when a given software alert data object has an affirmative superior participant indicator, where, if the given software alert data object satisfies the condition, the given software alert data object is assigned a respective entity-based alert priority designation and the entity-based alert priority score adjustment score for the respective entity-based alert priority designation. As another example, an entity-based alert priority score adjustment model may be associated with a condition that is satisfied when the average seniority level of participant profiles associated with a software alert data object satisfies an a superiority level threshold, where, if the given software alert data object satisfies the condition, the given software alert data object is assigned a respective entity-based alert priority designation and the entity-based alert priority score adjustment score for the respective entity-based alert priority designation.

In some embodiments, the entity-based alert priority score adjustment model may perform operations of the process 512A that is depicted in FIG. 8. As depicted in FIG. 8, the process 512A begins at operation 801 when the software monitoring data management computing device 106 identifies one or more entity participation features of a software alert data object. An entity participation feature may describe at least one property (e.g., a seniority/superiority/importance level property) of at least one participant profile for the software data object. The participant profiles for the software alert data object may include user profiles and/or team profiles that are tagged on an alert entry for a software alert data object, that are part of multi-party communication platforms/channels associated with the software alert data object (e.g., associated with a team identifier for the software alert data object), that are invited to and/or participate in audioconferencing/videoconferencing events associated with the software alert data object, and/or the like). An example of an entity participation feature for a software alert data object is a superior participant indicator that describes whether a required number (e.g., one) and/or a required ratio of participant profiles for a software alert data object are associated with a superiority/seniority/importance designation. For example, in some embodiments, if a software alert data object is associated with at least one senior/superior/important participant profile, the software alert data object is assigned an affirmative superior participant profile. Another example of entity participation feature for a software alert data object is an entity participation feature that is determined based on whether the average seniority level of participant profiles associated with a software alert data object satisfies and a superiority level threshold.

At operation 802, the software monitoring data management computing device 106 maps the map the one or more entity participation features for the software alert data object to an entity-based alert priority designation for the software alert data object. The entity-based alert priority designation may describe a condition satisfied by the one or more entity participation features for a software alert data object. In some embodiments, the entity-based alert priority score adjustment model defines one or more conditions, where each condition is satisfied when the entity participation features of a given software alert data object satisfy particular requirements, and where each condition is associated with an entity-based alert priority designation having a respective entity-based alert priority score adjustment score. For example, an entity-based alert priority score adjustment model may be associated with a condition that is satisfied when a given software alert data object has an affirmative superior participant indicator, where, if the given software alert data object satisfies the condition, the given software alert data object is assigned a respective entity-based alert priority designation. As another example, an entity-based alert priority score adjustment model may be associated with a condition that is satisfied when the average seniority level of participant profiles associated with a software alert data object satisfies and a superiority level threshold, where, if the given software alert data object satisfies the condition, the given software alert data object is assigned a respective entity-based alert priority designation.

At operation 803, the software monitoring data management computing device 106 assigns the entity-based alert priority score adjustment score for the entity-based alert priority designation of the software alert data object to the software alert data object. The entity-based alert priority score adjustment score may describe an alert priority score that is assigned to the software alert data object based on the entity-based alert priority designation for the software alert data object. For example, an entity-based alert priority score adjustment model may be associated with a condition that is satisfied when a given software alert data object has an affirmative superior participant indicator, where, if the given software alert data object satisfies the condition, the given software alert data object is assigned a respective entity-based alert priority designation and the entity-based alert priority score adjustment score for the respective entity-based alert priority designation. As another example, an entity-based alert priority score adjustment model may be associated with a condition that is satisfied when the average seniority level of participant profiles associated with a software alert data object satisfies a superiority level threshold, where, if the given software alert data object satisfies the condition, the given software alert data object is assigned a respective entity-based alert priority designation and the entity-based alert priority score adjustment score for the respective entity-based alert priority designation.

Figure 5:
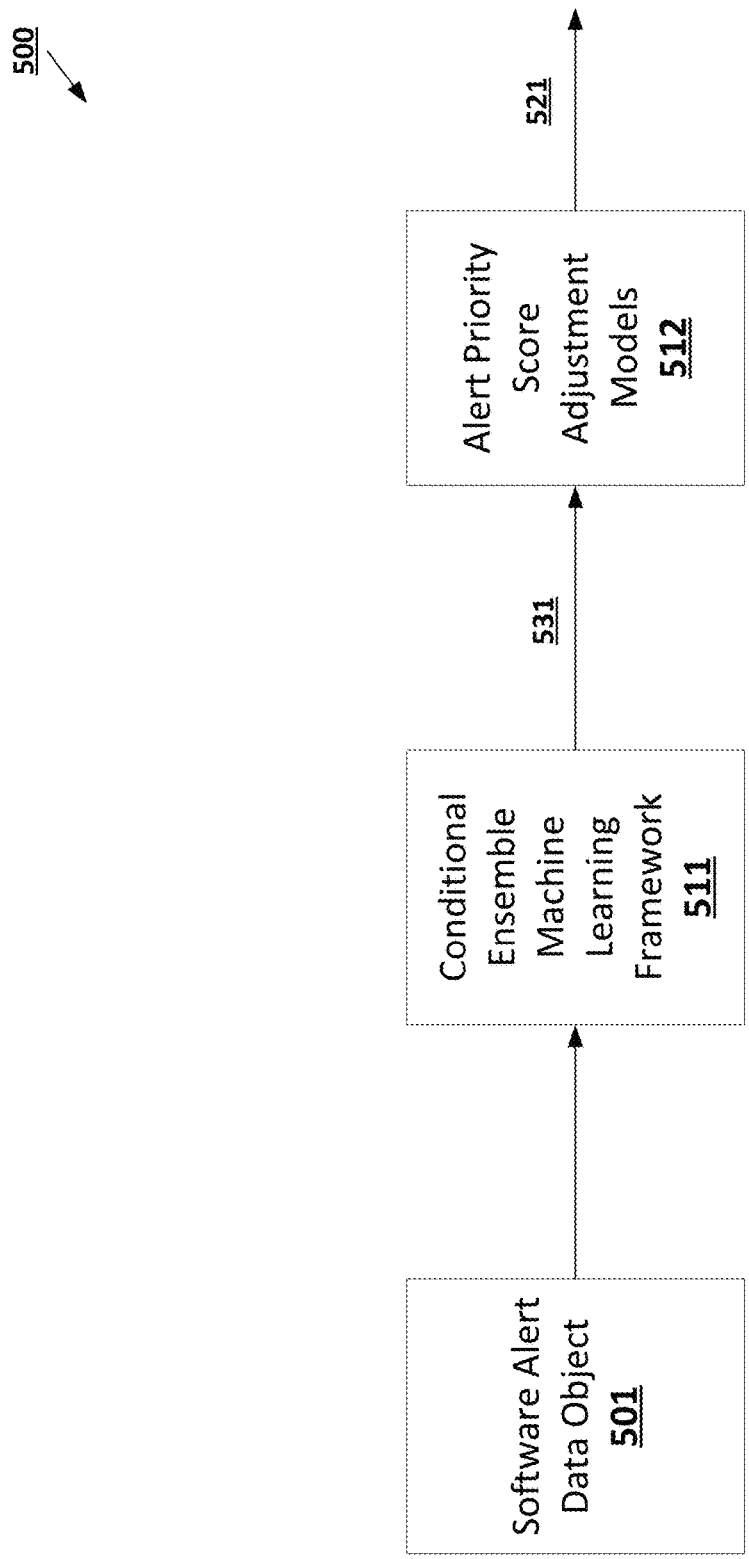
FIG. 5 is a data flow diagram of an example process for generating an alert signature for a software alert data object in accordance with at least some embodiments of the present invention.

Returning to FIG. 5, in some embodiments, a temporal alert priority score adjustment model may be configured to: (i) map a software alert data object to a temporal alert priority designation based on one or more real-time operational features of a current operational state of a corresponding software application framework that is associated with the software alert data object, and (ii) assign an alert priority adjustment score that is associated with the temporal alert priority designation (referred to herein as a temporal alert priority score adjustment score) to the software alert data object. In some embodiments, the temporal alert priority score adjustment model defines one or more conditions, where each condition is satisfied when real-time importance indicators for alert attribute data fields of the software alert data object satisfy particular requirements, and where each condition is associated with a temporal alert priority designation having a respective temporal alert priority score adjustment score. For example, a temporal alert priority score adjustment model may be associated with a condition that is satisfied when a team identifier of a given software alert data object is associated with a real-time importance indicator that describes that the particular team is currently in a critical condition, where, if the given software alert data object satisfies the condition, the given software alert data object is assigned a respective temporal alert priority designation and the temporal alert priority score adjustment score for the respective temporal alert priority designation. As another example, a temporal alert priority score adjustment model may be associated with a condition that is satisfied when at least one of module/component/subsystem identifiers of a given software alert data object (that describes which modules/components/subsystems of a corresponding software application framework are affected by the given software alert data object) is associated with a real-time importance indicator that describes that the particular affected module/component/subsystem is currently in a critical condition, where, if the given software alert data object satisfies the condition, the given software alert data object is assigned a respective temporal alert priority designation and the temporal alert priority score adjustment score for the respective temporal alert priority designation.

In some embodiments, the entity-based alert priority score adjustment model may perform operations of the process 512B that is depicted in FIG. 9. As depicted in FIG. 9, the process 512B begins at operation 901 when the software monitoring data management computing device 106 determines, for each alert attribute data field of a software alert data object, a real-time importance indicator. The real-time importance indicator may describe whether a corresponding alert attribute data field of a software alert data object is currently experiencing a maintenance-critical period as described by one or more real-time operational features of a current operational state of the software application framework. For example, the real-time importance indicator for a team identifier of a software alert data object may describe whether the corresponding team is currently in a critical condition. As another example, the real-time importance indicator for an alert attribute data field that describes module/component/subsystem identifiers of a given software alert data object may describe whether at least one of the affected modules/components/subsystems is currently in a critical condition.

At operation 902, the software monitoring data management computing device 106 generates a temporal alert priority designation for the software alert data object based on the real-time importance indicators for the alert attribute data fields of the software alert data object. In some embodiments, the temporal alert priority designation describes how many of and/or what ratio of the real-time importance indicators for the alert attribute data fields of the software alert data object are affirmative real-time importance indicators (i.e., describe that the corresponding alert attribute data fields currently are associated with maintenance-critical conditions). In some embodiments, the temporal alert priority designation for a software alert data object describes whether at least one of the real-time importance indicators for the alert attribute data fields of the software alert data object are affirmative real-time importance indicators. In some embodiments, the temporal alert priority designation for a software alert data object describes a statistical distribution measure (e.g., an average measure of) the real-time importance indicators for the alert attribute data fields of the software alert data object. For example, a temporal alert priority score adjustment model may be associated with a condition that is satisfied when a team identifier of a given software alert data object is associated with a real-time importance indicator that describes that the particular team is currently in a critical condition, where, if the given software alert data object satisfies the condition, the given software alert data object is assigned a respective temporal alert priority designation. As another example, a temporal alert priority score adjustment model may be associated with a condition that is satisfied when at least one of module/component/subsystem identifiers of a given software alert data object (that describes which modules/components/subsystems of a corresponding software application framework are affected by the given software alert data object) is associated with a real-time importance indicator that describes that the particular affected module/component/subsystem is currently in a critical condition, where, if the given software alert data object satisfies the condition, the given software alert data object is assigned a respective temporal alert priority designation.

At operation 903, the software monitoring data management computing device 106 assigns the temporal alert priority score adjustment score for the temporal alert priority designation of the software alert data object to the software alert data object. The temporal alert priority score adjustment score may describe an alert priority score that is assigned to the software alert data object based on the temporal alert priority designation for the software alert data object. For example, a temporal alert priority score adjustment model may be associated with a condition that is satisfied when a team identifier of a given software alert data object is associated with a real-time importance indicator that describes that the particular team is currently in a critical condition, where, if the given software alert data object satisfies the condition, the given software alert data object is assigned a respective temporal alert priority designation and the temporal alert priority score adjustment score for the respective temporal alert priority designation. As another example, a temporal alert priority score adjustment model may be associated with a condition that is satisfied when at least one of module/component/subsystem identifiers of a given software alert data object (that describes which modules/components/subsystems of a corresponding software application framework are affected by the given software alert data object) is associated with a real-time importance indicator that describes that the particular affected module/component/subsystem is currently in a critical condition, where, if the given software alert data object satisfies the condition, the given software alert data object is assigned a respective temporal alert priority designation and the temporal alert priority score adjustment score for the respective temporal alert priority designation.

Returning to FIG. 5, a similarity-based alert priority score adjustment model may be configured to: (i) for each historical software alert data object of a plurality of historical software alert data objects that is associated with a historical alert priority score, generate a pairwise alert similarity score with respect to the software alert data object, (ii) generate a similarity-based alert priority designation for the software alert data object based on each historical alert priority score and each pairwise alert similarity, and (iii) generate a similarity-based alert priority score adjustment score for the software alert data object based on the similarity-based alert priority designation.

In some embodiments, the similarity-based alert priority score adjustment model may perform operations of the process 512C that is depicted in FIG. 10. As depicted in FIG. 10, the process 512C begins at operation 1001 when the software monitoring data management computing device 106 generates, for each historical software alert data object of a set of historical software alert data objects, a pairwise alert similarity score with respect to a particular input software alert data object that describes a computed/predicted degree of similarity between the historical software alert data object and the particular input software alert data object. In some embodiments, to generate the pairwise similarity score for two software alert data objects: (i) for each software alert data object of the two software alert data objects, one or more alert attribute data fields of the software alert data object are extracted and morphed/transformed, using a morpher model, into a standardized form to generate a standardized software alert document (e.g., where the field types of the more alert attribute data fields and the standardized form is defined by developer-defined configuration data for the similarity-based alert priority score adjustment model), and (ii) the two standardized software alert documents for the two software alert data objects are compared (e.g., by generating a Euclidean distance of the Paragraph2Vec representations of the two standardized software alert documents) to generate the pairwise similarity score for the two software alert data objects. In some embodiments, the set of historical software alert data objects include a set of software alert data object that were historically determined/recorded to be important, high-priority, maintenance-critical, and/or related to a software incident data object. In some embodiments, the morpher model extracts, for a software alert data object, one or more alert attribute data fields associated with one or more alert attribute data field types, such as with one or more of the title of the software alert data object (e.g., a predicted title for a new software alert data object and a ground-truth title for a historical software alert data object), one or more priority scores for the software alert data object (e.g., predicted priority scores for a new software alert data object and ground-truth priority scores for a historical software alert data objects), one or more impacted services/subsystems for the software alert data object, and/or the like.

At operation 1002, the software monitoring data management computing device 106 generates a similarity-based alert priority designation for the software alert data object based on the pairwise similarity scores. In some embodiments, if at least one pairwise similarity score for a software alert data object satisfies (e.g., exceeds) a pairwise similarity threshold, then the software alert data object is assigned an affirmative similarity-based alert priority designation. In some embodiments, if at least m pairwise similarity scores for a software alert data object satisfies (e.g., exceeds) a pairwise similarity threshold, then the software alert data object is assigned an affirmative similarity-based alert priority designation, where m may be defined by developer-defined configuration data for the similarity-based alert priority score adjustment model.

At operation 1003, the software monitoring data management computing device 106 generates a similarity-based alert priority score adjustment for the software alert data object based on the similarity-based alert priority designation for the software alert data object. The similarity-based alert priority score adjustment score may describe an alert priority score that is assigned to the software alert data object based on the similarity-based alert priority designation for the software alert data object. For example, a similarity-based alert priority score adjustment model may be associated with a condition that is satisfied when at least one pairwise similarity score for a given software alert data object satisfies (e.g., exceeds) a pairwise similarity threshold, where, if the given software alert data object satisfies the condition, the given software alert data object is assigned a respective similarity-based alert priority designation and the similarity-based alert priority score adjustment score for the respective similarity-based alert priority designation.

In some embodiments, the alert classification score for the software alert data object can be used to perform one or more incident management actions with respect to the software alert data object. For example, performing the one or more incident management actions may include enabling display of a prediction output user interface that displays the one or more alert signatures. As another example, performing the one or more incident management actions may include enabling display of a prediction output user interface that is configured to receive one or more user feedback data objects for the one or more incident clusters, where at least one of the machine learning models introduced herein is retrained using the one or more user feedback data objects. As yet another example, performing the one or more incident management actions may include enabling display of a prediction output user interface that is configured to display a ranking of the one or more incident clusters in accordance with the one or more cluster priority scores, where the cluster priority score for an incident cluster may be determined by combining each monitoring data priority score for a software alert data object that is in the incident cluster. As a further example, performing the one or more incident management actions may include performing one or more automated system maintenance operations for the software application framework in accordance with the alert signatures. In some embodiments, an incident manager generates an incident review data object after filing a software incident.

Other examples of incident management actions that may be performed by the software monitoring data management computing device 106 include: (i) ranking of the incident clusters (e.g., based on a count of software alert data objects associated with the incident clusters, timestamps of software alert data objects associated with the incident clusters, relevance of software alert data objects associated with the incident clusters to a user, and/or the like) before presenting the incident clusters, (ii) re-ranking of the incident clusters (e.g., based on user feedback and/or any incoming software alert data objects associated with the incident clusters), (iii) cluster pruning (e.g., by removing noisy or less relevant software alert data objects from incident clusters), and (iv) cluster merging (e.g., by merging two or more incident clusters that may have occurred in different timestamps but may otherwise be associated with a common alert signature and/or with similar alert signatures).

In some embodiments, the software monitoring data management computing device 116 generates user interface data that displays, for a particular software alert data object, the predicted alert severity level for the software alert data object that is generated based on the alert classification score for the software alert data object and a human-generated alert severity level for the software alert data object. An example of such a user interface 1100 is depicted in FIG. 11. As depicted in FIG. 11, the user interface 1100 displays, for a software alert data object that is associated with the alert identifier HOT 96626 (which is entered using the user interface element 1101), the predicted alert severity level 1103 and the human-generated alert severity level 1104. As further depicted in FIG. 11, the user interface 1100 displays the textual description 1102 for the software alert data object that is associated with the alert identifier HOT 96626.

In some embodiments, the software monitoring data management computing device 116 generates user interface data that displays an alert signature for a software application framework, where the alert signature describes recall measures, precision measures, and/or F-measures associated with predicted alert severity levels for a set of software alert data objects that are associated with a particular software application framework. For example, the user interface 1300 of FIG. 13 displays, for a set of software alert data objects that are associated with a time range selected using the user interface elements 1201-1202 of the user interface 1200 of FIG. 12), recall measures, precision measures, and Fi measures using the user interface elements 1301-1309. FIG. 13 also provides the user interface element 1311 that depicts, using a right bar and a left bar, accuracy measures for human-generated alert severity levels and predicted alert severity levels for software alert data objects respectively.

In particular, the user interface element 1301 of FIG. 13 depicts, using a right bar and a left bar, the recall rates for predicted alert severity levels indicating a zeroth severity level and for human-generated alert severity levels indicating a zeroth severity level, respectively. In other words, the user interface element 1301 depicts (using right left bar) the recall rate for those software alert data objects that are associated with the selected time range and predicted alert severity levels indicating a zeroth severity level, as well as (using the left bar) the recall rate for those software alert data objects that are associated with the selected time range and human-generated alert severity levels indicating a zeroth severity level.

In addition, the user interface element 1302 of FIG. 13 depicts, using a right bar and a left bar, the precision rates for predicted alert severity levels indicating a zeroth severity level and for human-generated alert severity levels indicating a zeroth severity level respectively. In other words, the user interface element 1302 depicts (using the right bar) the precision rate for those software alert data objects that are associated with the selected time range and predicted alert severity levels indicating a zeroth severity level, as well as (using the left bar) the precision rate for those software alert data objects that are associated with the selected time range and human-generated alert severity levels indicating a zeroth severity level.

Furthermore, the user interface element 1303 of FIG. 13 depicts, using a right bar and a left bar, the Fi scores for predicted alert severity levels indicating a zeroth severity level and for human-generated alert severity levels indicating a zeroth severity level respectively. In other words, the user interface element 1303 depicts (using the right bar) the Fi for those software alert data objects that are associated with the selected time range and predicted alert severity levels indicating a zeroth severity level, as well as (using the left bar) the Fi for those software alert data objects that are associated with the selected time range and human-generated alert severity levels indicating a zeroth severity level.

Moreover, the user interface element 1304 of FIG. 13 depicts, using a right bar and a left bar, the recall rates for predicted alert severity levels indicating a first severity level and for human-generated alert severity levels indicating a first severity level, respectively. In other words, the user interface element 1304 depicts (using the right bar) the recall rate for those software alert data objects that are associated with the selected time range and predicted alert severity levels indicating a first severity level, as well as (using the left bar) the recall rate for those software alert data objects that are associated with the selected time range and human-generated alert severity levels indicating a first severity level.

Additionally, the user interface element 1305 of FIG. 13 depicts, using a right bar and a left bar, the precision rates for predicted alert severity levels indicating a first severity level and for human-generated alert severity levels indicating a first severity level, respectively. In other words, the user interface element 1305 depicts (using the right bar) the precision rate for those software alert data objects that are associated with the selected time range and predicted alert severity levels indicating a first severity level, as well as (using the left bar) the precision rate for those software alert data objects that are associated with the selected time range and human-generated alert severity levels indicating a first severity level.

Furthermore, the user interface element 1306 of FIG. 13 depicts, using a right bar and a left bar, the Fi scores for predicted alert severity levels indicating a first severity level and for human-generated alert severity levels indicating a first severity level respectively. In other words, the user interface element 1306 depicts (using the right bar) the Fi for those software alert data objects that are associated with the selected time range and predicted alert severity levels indicating a first severity level, as well as (using the left bar) the Fi for those software alert data objects that are associated with the selected time range and human-generated alert severity levels indicating a first severity level.

Furthermore, the user interface element 1307 of FIG. 13 depicts, using a right bar and a left bar, the recall rates for predicted alert severity levels indicating a second severity level and for human-generated alert severity levels indicating a second severity level, respectively. In other words, the user interface element 1307 depicts (using the right bar) the recall rate for those software alert data objects that are associated with the selected time range and predicted alert severity levels indicating a second severity level, as well as (using the left bar) the recall rate for those software alert data objects that are associated with the selected time range and human-generated alert severity levels indicating a second severity level.

Additionally, the user interface element 1308 of FIG. 13 depicts, using a right bar and a left bar, the precision rates for predicted alert severity levels indicating a second severity level and for human-generated alert severity levels indicating a second severity level, respectively. In other words, the user interface element 1308 depicts (using the right bar) the precision rate for those software alert data objects that are associated with the selected time range and predicted alert severity levels indicating a second severity level, as well as (using the left bar) the precision rate for those software alert data objects that are associated with the selected time range and human-generated alert severity levels indicating a second severity level.

Moreover, the user interface element 1309 of FIG. 13 depicts, using a right bar and a left bar, the Fi scores for predicted alert severity levels indicating a second severity level and for human-generated alert severity levels indicating a second severity level respectively. In other words, the user interface element 1309 depicts (using the right bar) the Fi for those software alert data objects that are associated with the selected time range and predicted alert severity levels indicating a second severity level, as well as (using the left bar) the Fi for those software alert data objects that are associated with the selected time range and human-generated alert severity levels indicating a second severity level. Accordingly, to address a range of challenges related to monitoring complex software application frameworks, various embodiments of the present invention describe techniques for generating alert signatures for a complex software application framework that are determined based on predicted alert severity levels for software alert data objects. These predicted alert severity levels may be generated by various machine learning techniques in order to generate effective alert signatures for a software application framework. By using the described techniques, various embodiments of the present invention generate predictive insights about severity levels of software alert data objects that can be used to increase efficiency and effectiveness of software application and software service monitoring. In doing so, various embodiments of the present invention make substantial technical contributions to improving the efficiency and the effectiveness of monitoring complex software application frameworks.

In some embodiments, the software monitoring data management computing device 106 generates user interface data for a document user interface that displays: (i) content data associated with a corresponding document data object, and (ii) links to one or more high-priority software alert data objects that are determined/computed/predicted to be related to the corresponding document data object. An operational example of such a document user interface 1400 is depicted in FIG. 14. As depicted in FIG. 14, the document user interface 1400 includes content data associated with a corresponding document user interface. As further depicted in FIG. 14, the document user interface 1400 the user interface element 1401 that includes a link to a high-priority software alert data object that is determined/computed/predicted to be related to the corresponding document data object.

In some embodiments, the alert signature for a sequence of software alert data objects can be used to generate a predicted incident priority designation for a corresponding predicted software incident data object data object, where the predicted incident priority designation is depicted using an incident management user interface, such as the incident management user interface 1500 of FIG. 15A that depicts the predicted incident priority designation 1501 for a first predicted software incident data object. In some embodiments, user interaction with the icons associated with the first predicted software incident data object causes depiction of the incident management user interface 1550 of FIG. 15B, which enables depicting the software alert data objects associated with the selected predicted software incident data object as well as providing user-selected validity indicators for the predicted software incident data object using the buttons 1502.

An operational example of a software architecture for executing/performing process 500 is depicted in FIG. 16. As depicted in FIG. 16, a software alert data object 1601 is processed through a featurization engine 1602 to generate the software alert data fields 1603 which are then processed by the conditional ensemble machine learning framework 1604 to generate an initial alert signature 1605. As described above, the conditional ensemble machine learning framework 1604 may comprise one or more alert priority score generation machine learning models, one or more alert priority explanation generation machine learning models, and a conditional ensemble machine learning model 1611 that is configured to generate an explanation-inclusive alert signature if a deep-learning-based alert priority score generated by the alert priority score generation machine learning models is identical to a decision-tree-based alert priority designation generated by the alert priority explanation generation machine learning models.

As further depicted in FIG. 16, the software alert data object 1601 is further processed by a morpher model 1606 to generate a standardized software alert document 1607. In some embodiments, the standardized software alert document 1607 comprises one or more alert attribute data fields associated with one or more alert attribute data field types, such as with one or more of the title of the software alert data object (e.g., a predicted title for a new software alert data object and a ground-truth title for a historical software alert data object), one or more priority scores for the software alert data object (e.g., predicted priority scores for a new software alert data object and ground-truth priority scores for a historical software alert data objects), one or more impacted services/subsystems for the software alert data object, and/or the like. In some embodiments, a similarity search engine 1608 compares the standardized software alert document 1607 with the historical standardized software alert documents 1609 for historical software alert data objects to generate similarity metadata 1610 that describe related historical software alert data objects for the software alert data object 1601.

As further depicted in FIG. 16, the initial alert signature 1605 is updated by three alert priority score adjustment models to generate priority explanation metadata 1641 describing a final alert/incident priority score and/or final alert/incident priority explanation metadata: the entity-based alert priority score adjustment model 1621, also referred to as the importance booster model; the temporal alert priority score adjustment model 1622, also referred to as the temporal booster model; and the similarity-based alert priority score adjustment model 1623, also referred to as the similarity booster model.

As described above, the entity-based alert priority score adjustment model 1621 may be configured to: (i) map a software alert data object to an entity-based alert priority designation based on one or more entity participation features for the software alert data object, and (ii) assign an alert priority adjustment score that is associated with the entity-based alert priority designation (referred to herein as an entity-based alert priority score adjustment score) to the software alert data object. In some embodiments, the entity-based alert priority score adjustment model defines one or more conditions, where each condition is satisfied when the entity participation features of a given software alert data object satisfy particular requirements, and where each condition is associated with an entity-based alert priority designation having a respective entity-based alert priority score adjustment score. For example, an entity-based alert priority score adjustment model may be associated with a condition that is satisfied when a given software alert data object has an affirmative superior participant indicator, where, if the given software alert data object satisfies the condition, the given software alert data object is assigned a respective entity-based alert priority designation and the entity-based alert priority score adjustment score for the respective entity-based alert priority designation. As another example, an entity-based alert priority score adjustment model may be associated with a condition that is satisfied when the average seniority level of participant profiles associated with a software alert data object satisfies an a superiority level threshold, where, if the given software alert data object satisfies the condition, the given software alert data object is assigned a respective entity-based alert priority designation and the entity-based alert priority score adjustment score for the respective entity-based alert priority designation.

As depicted in FIG. 16, the entity-based alert priority score adjustment model 1621 may generate the entity-based alert priority designation based on entity participation features that describe participation of participant entities associated with the software alert data object in particular organizational hierarchic 1631, particular war rooms 1632, and/or particular external integration applications 1633.

As further described above, the temporal alert priority score adjustment model 1622 may be configured to: (i) map a software alert data object to a temporal alert priority designation based on one or more real-time operational features of a current operational state of a corresponding software application framework that is associated with the software alert data object, and (ii) assign an alert priority adjustment score that is associated with the temporal alert priority designation (referred to herein as a temporal alert priority score adjustment score) to the software alert data object. In some embodiments, the temporal alert priority score adjustment model defines one or more conditions, where each condition is satisfied when real-time importance indicators for alert attribute data fields of the software alert data object satisfy particular requirements, and where each condition is associated with a temporal alert priority designation having a respective temporal alert priority score adjustment score. For example, a temporal alert priority score adjustment model may be associated with a condition that is satisfied when a team identifier of a given software alert data object is associated with a real-time importance indicator that describes that the particular team is currently in a critical condition, where, if the given software alert data object satisfies the condition, the given software alert data object is assigned a respective temporal alert priority designation and the temporal alert priority score adjustment score for the respective temporal alert priority designation. As another example, a temporal alert priority score adjustment model may be associated with a condition that is satisfied when at least one of module/component/subsystem identifiers of a given software alert data object (that describes which modules/components/subsystems of a corresponding software application framework are affected by the given software alert data object) is associated with a real-time importance indicator that describes that the particular affected module/component/subsystem is currently in a critical condition, where, if the given software alert data object satisfies the condition, the given software alert data object is assigned a respective temporal alert priority designation and the temporal alert priority score adjustment score for the respective temporal alert priority designation.

As further described above, the similarity-based alert priority score adjustment model 1623 may be configured to: (i) for each historical software alert data object of a plurality of historical software alert data objects that is described by the similarity metadata 1610 and associated with a historical alert priority score, generate a pairwise alert similarity score with respect to the software alert data object, (ii) generate a similarity-based alert priority designation for the software alert data object based on each historical alert priority score and each pairwise alert similarity, and (iii) generate a similarity-based alert priority score adjustment score for the software alert data object based on the similarity-based alert priority designation.

Accordingly, as described above, to address technical challenges related to monitoring complex software application frameworks, various embodiments of the present invention describe techniques for generating alert signatures for software alert data objects of a complex software application framework that are determined using at least one of: (i) a conditional ensemble machine learning framework comprise one or more alert priority score generation machine learning models, one or more alert priority explanation generation machine learning models, and a conditional ensemble machine learning model that is configured to generate an explanation-inclusive alert signature if a deep-learning-based alert priority score generated by the alert priority score generation machine learning models is identical to a decision-tree-based alert priority designation generated by the alert priority explanation generation machine learning models, and (ii) a set of alert priority score adjustment models such as an entity-based alert priority score adjustment model, a temporal alert priority score adjustment model, and a similarity-based alert priority score adjustment model.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to a suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including, by way of example, a programmable processor, a computer, a system on a chip, or multiple chips, or combinations of the foregoing. The apparatus can include special purpose logic circuitry, e.g., an FPGA (field programmable gate array) or an ASIC (Application Specific Integrated Circuit). The apparatus can also include, in addition to hardware, code that creates a limited interaction mode and/or a non-limited interaction mode for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services and distributed computing and grid computing infrastructures.

A computer program (also known as a program, software, software application, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language page), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending pages to and receiving pages from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus for predictive monitoring of a software application framework, the apparatus comprising at least one processor and at least one non-transitory memory comprising a computer program code, the at least one non-transitory memory and the computer program code configured to, with the at least one processor, cause the apparatus to:
   identify, by the processor, a software alert data object for the software application framework, wherein the software alert data object is associated with one or more alert attribute data fields;
   generate, by the processor and using an alert classification neural network machine learning model, and based on the one or more alert attribute data fields, a deep-learning-based alert priority designation for the software alert data object;

generate, by the processor and using an alert classification decision tree machine learning model, and based on the one or more alert attribute data fields, a decision-tree-based alert priority designation for the software alert data object;

generate, by the processor and based on the deep-learning-based alert priority designation and the decision-tree-based alert priority designation, an alert signature for the software alert data object; and cause, by the processor, performance of one or more incident management actions based on the alert signature.

2. The apparatus of claim 1, wherein generating the alert signature comprises:

generating the alert signature using a conditional ensemble machine learning model and based on the deep-learning-based alert priority designation and the decision-tree-based alert priority designation.

3. The apparatus of claim 2, wherein:

the deep-learning-based alert priority designation corresponds to a first alert priority designation that is selected from a plurality of alert priority designations described by an alert priority designation schema, and the decision-tree-based alert priority designation corresponds to a second alert priority designation that is selected from the plurality of alert priority designations described by the alert priority designation schema.

4. The apparatus of claim 3, wherein:

the alert classification neural network machine learning model is configured to generate a deep-learning-based alert priority score that is then mapped to the deep-learning-based alert priority designation.

5. The apparatus of claim 4, wherein:

the alert classification decision tree machine learning model is configured to generate a tree traversal sequence for the software alert data object, and generating the alert signature comprises:

in response to determining that the first alert priority designation and the second alert priority designation are identical, generating the alert signature based on the deep-learning-based alert priority score and alert priority score explanatory metadata that is generated based on the tree traversal sequence.

6. The apparatus of claim 4, wherein generating the alert signature comprises:

in response to determining that the first alert priority designation and the second alert priority designation are different, generating the alert signature based on the deep-learning-based alert priority score.

7. The apparatus of claim 1, wherein:

the alert signature describes an alert priority score that is generated based on: (i) a deep-learning-based alert priority score that is generated by the deep-learning-based alert priority designation, and (ii) one or more alert priority score adjustment scores that are generated by one or more alert priority score adjustment models.

8. The apparatus of claim 7, wherein the one or more alert priority score adjustment models comprise an entity-based alert priority score adjustment model that is configured to:

identify one or more entity participation features of the one or more alert attribute data fields, map the one or more entity participation features to an entity-based alert priority designation for the software alert data object, and generate an entity-based alert priority score adjustment score for the software alert data object based on the entity-based alert priority designation.

9. The apparatus of claim 8, wherein the one or more entity participation features comprise a superior participant indicator.

10. The apparatus of claim 7, wherein the one or more alert priority score adjustment models comprise a temporal alert priority score adjustment model that is configured to:

for each alert attribute data field, generate a real-time importance indicator based on one or more real-time operational features of a current operational state of the software application framework, generate a temporal alert priority designation for the software alert data object based on each real-time importance indicator, and generate a temporal alert priority score adjustment score for the software alert data object based on the temporal alert priority designation.

11. The apparatus of claim 7, wherein the one or more alert priority score adjustment models comprise a similarity-based alert priority score adjustment model that is configured to:

for each historical software alert data object of a plurality of historical software alert data objects that is associated with a historical alert priority score, generate a pairwise alert similarity score with respect to the software alert data object, generate a similarity-based alert priority designation for the software alert data object based on each historical alert priority score and each pairwise alert similarity, and generate a similarity-based alert priority score adjustment score for the software alert data object based on the similarity-based alert priority designation.

12. A computer-implemented method for predictive monitoring of a software application framework, the computer-implemented method comprising:

Identifying, by a computer processor, a software alert data object for the software application framework, wherein the software alert data object is associated with one or more alert attribute data fields;

generating, by the computer processor and using an alert classification neural network machine learning model, and based on the one or more alert attribute data fields, a deep-learning-based alert priority designation for the software alert data object;

generating, by the computer processor and using an alert classification decision tree machine learning model, and based on the one or more alert attribute data fields, a decision-tree-based alert priority designation for the software alert data object;

generating, by the computer processor and based on the deep-learning-based alert priority designation and the decision-tree-based alert priority designation, an alert signature for the software alert data object; and causing, by the computer processor, performance of one or more incident management actions based on the alert signature.

13. The computer-implemented method of claim 12, wherein generating the alert signature comprises:

generating the alert signature using a conditional ensemble machine learning model and based on the deep-learning-based alert priority designation and the decision-tree-based alert priority designation.

14. The computer-implemented method of claim 13, wherein:
the deep-learning-based alert priority designation corresponds to a first alert priority designation that is selected from a plurality of alert priority designations described by an alert priority designation schema, and
the decision-tree-based alert priority designation corresponds to a second alert priority designation that is selected from the plurality of alert priority designations described by the alert priority designation schema.

15. The computer-implemented method of claim 14, wherein:
the alert classification neural network machine learning model is configured to generate a deep-learning-based alert priority score that is then mapped to the deep-learning-based alert priority designation.

16. The computer-implemented method of claim 15, wherein:
the alert classification decision tree machine learning model is configured to generate a tree traversal sequence for the software alert data object, and generating the alert signature comprises:
in response to determining that the first alert priority designation and the second alert priority designation are identical, generating the alert signature based on the deep-learning-based alert priority score and alert priority score explanatory metadata that is generated based on the tree traversal sequence.

17. The computer-implemented method of claim 12, wherein:
the alert signature describes an alert priority score that is generated based on: (i) a deep-learning-based alert priority score that is generated by the deep-learning-based alert priority designation, and (ii) one or more alert priority score adjustment scores that are generated by one or more alert priority score adjustment models.

18. The computer-implemented method of claim 17, wherein the one or more alert priority score adjustment models comprise an entity-based alert priority score adjustment model that is configured to:
identify one or more entity participation features of the one or more alert attribute data fields,
map the one or more entity participation features to an entity-based alert priority designation for the software alert data object, and
generate an entity-based alert priority score adjustment score for the software alert data object based on the entity-based alert priority designation.

19. The computer-implemented method of claim 17, wherein the one or more alert priority score adjustment models comprise a temporal alert priority score adjustment model that is configured to:
for each alert attribute data field, generate a real-time importance indicator based on one or more real-time operational features of a current operational state of the software application framework,
generate a temporal alert priority designation for the software alert data object based on each real-time importance indicator, and
generate a temporal alert priority score adjustment score for the software alert data object based on the temporal alert priority designation.

20. A computer program product for predictive monitoring of a software application framework, the computer program product comprising at least one non-transitory computer-readable storage medium having computer-readable program code portions stored therein, the computer-readable program code portions configured to:
identify, upon execution by a processor, a software alert data object for the software application framework, wherein the software alert data object is associated with one or more alert attribute data fields;
generate, upon execution by the processor and using an alert classification neural network machine learning model, and based on the one or more alert attribute data fields, a deep-learning-based alert priority designation for the software alert data object;
generate, upon execution by the processor and using an alert classification decision tree machine learning model, and based on the one or more alert attribute data fields, a decision-tree-based alert priority designation for the software alert data object;
generate, upon execution by the processor and based on the deep-learning-based alert priority designation and the decision-tree-based alert priority designation, an alert signature for the software alert data object; and
cause, upon execution by the processor, performance of one or more incident management actions based on the alert signature.

* * * * *